(12) United States Patent
Ehara et al.

(10) Patent No.: US 7,697,867 B2
(45) Date of Patent: Apr. 13, 2010

(54) IMAGE FORMING APPARATUS WITH FLUCTUATION-PATTERN DETECTION AND FINE-TUNING-PATTERN CORRECTION

(75) Inventors: Yasuhisa Ehara, Kanagawa (JP); Kazuhiko Kobayashi, Tokyo (JP); Joh Ebara, Kanagawa (JP); Toshiyuki Uchida, Kanagawa (JP); Noriaki Funamoto, Tokyo (JP); Keisuke Sugiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 152 days.

(21) Appl. No.: 11/987,994

(22) Filed: Dec. 6, 2007

(65) Prior Publication Data
US 2008/0166153 A1    Jul. 10, 2008

(30) Foreign Application Priority Data
Dec. 7, 2006   (JP)   ............... 2006-330181

(51) Int. Cl.
G03G 15/00   (2006.01)
G03G 15/01   (2006.01)
(52) U.S. Cl. .................. 399/167; 347/116; 399/301
(58) Field of Classification Search ................. 399/167, 399/301, 394, 395, 396, 302; 347/116; 358/406, 358/504
See application file for complete search history.

(56) References Cited

U.S. PATENT DOCUMENTS 6,469,809 B1   10/2002   Sasaki ................. 358/490

2006/0182465 A1   8/2006   Funamoto et al. ........... 399/167
2007/0196132 A1*   8/2007   Kobayashi et al. .......... 399/167
2007/0253736 A1*   11/2007   Ehara et al. ................. 399/167

FOREIGN PATENT DOCUMENTS

| EP | 1 434 107 | 6/2004 |
|---|---|---|
| JP | 10-078734 | 3/1998 |
| JP | 3104741 | 9/2000 |
| JP | 3455067 | 7/2003 |
| JP | 2006-047920 | 2/2006 |
| JP | 2006-47920 | 2/2006 |
| JP | 2006-058415 | 3/2006 |
| JP | 2006-201309 | 8/2006 |
| JP | 2006-259468 | 9/2006 |

OTHER PUBLICATIONS

Search Report dated Mar. 4, 2008 for corresponding European Application No. 07254686.4-1228.

* cited by examiner

*Primary Examiner*—Sophia S Chen
(74) *Attorney, Agent, or Firm*—Harness, Dickey & Pierce, P.L.C.

(57) ABSTRACT

After detecting a speed fluctuation pattern per rotation of a photosensitive drum, a process that forms an image based on image data while causing the photosensitive drum to rotate at a nonstandard linear speed is executed as an image forming process by driving a process driving motor that drives the photosensitive drum to curb a speed fluctuation of the photosensitive drum by using a driving speed fine tuning pattern. Before executing the image forming process, a fine-tuning-pattern correcting process is executed for correcting the driving speed fine tuning pattern of the process driving motor, based on the nonstandard linear speed.

20 Claims, 22 Drawing Sheets

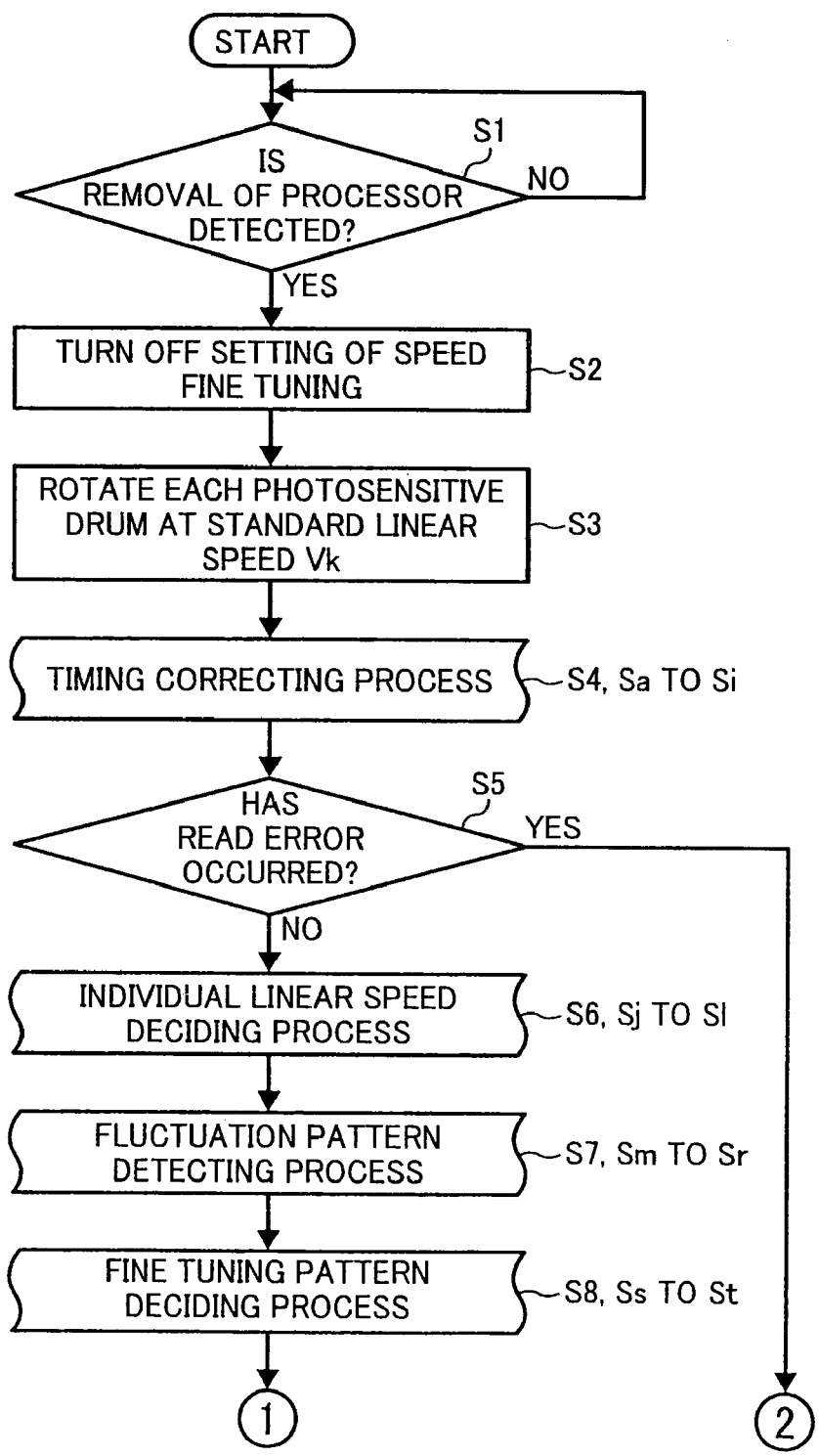

IMAGE FORMING APPARATUS WITH FLUCTUATION-PATTERN DETECTION AND FINE-TUNING-PATTERN CORRECTION

CROSS-REFERENCE TO RELATED APPLICATIONS

The present application claims priority to and incorporates by reference the entire contents of Japanese priority document 2006-330181 filed in Japan on Dec. 7, 2006.

BACKGROUND OF THE INVENTION

1. Field of the Invention

The present invention relates to an image forming apparatus, which transfers to a transfer member such as a recording sheet or an intermediate transfer belt, visual images that are formed on a surface of image carriers such as rotatably driven photosensitive drums.

2. Description of the Related Art

In an image forming apparatus, a displacement of dots occurs due to decentering of a driven gear, which transmits a rotary driving force to image carriers. To be specific, a decentering of the driven gear, which rotates on the same axial line as the image carriers, results in occurrence of a speed fluctuation of an attribute that causes the image carriers to draw a sine wave equivalent to one cycle per single rotation of the image carriers. The sine wave equivalent to one cycle occurs due to the following reasons. When a driving side gear is meshing with the longest diameter portion of the decentered driven gear, a linear speed of the image carriers becomes the slowest and when the driving side gear is meshing with the shortest diameter portion of the decentered driven gear, the linear speed of the image carriers becomes the fastest. Because the longest diameter portion and the shortest diameter portion are positioned at locations that are 180° apart from each other, the speed fluctuation per single rotation of the image carriers resembles the sine wave equivalent to one cycle. When the linear speed has increased than the original linear speed, dots formed on the image carriers reach a transfer position at an earlier timing than the original timing. Similarly, when the linear speed has decreased than the original linear speed, the dots formed on the image carriers reach the transfer position at a later timing than the original timing. Such a difference in the timings results in the displacement of the dots.

In the image forming apparatus, after forming visual images of different colors on the respective image carriers, the visual images are superposed on a transfer member and transferred to obtain a multicolor image. If the displacement of the dots mentioned earlier occurs in such an image forming apparatus, a color drift is noticeable in the multicolor image due to the displacement of the dots of the respective colors.

An image forming apparatus disclosed in Japanese Patent Application Laid-open No. 2006-47920 uses a technology to reduce the color drift. In other words, the image forming apparatus forms a speed-fluctuation detecting image that includes a plurality of toner images that are arranged at a predetermined pitch in a surface moving direction, at a predetermined timing, on a surface of the respective image carriers in the form of photosensitive drums. After transferring the speed-fluctuation detecting image on a transfer belt, photo sensors are used to detect each toner image in the transfer belt shaped speed-fluctuation detecting image, and based on detection intervals, a speed fluctuation pattern per single rotation of the respective photosensitive drums is detected. Next, based on the respective speed fluctuation pattern, a driving speed fine tuning pattern (for example, a pattern that is antiphase with respect to the speed fluctuation pattern and that includes an equal amplitude and cycles) is specified that enables to negate the speed fluctuation of the photosensitive drums. The driving speed fine tuning pattern is specified for each of the respective photosensitive drums. Next, when forming the image based on image data that is transmitted from a personal computer etc., each photosensitive drum is driven using the respective prior specified driving speed fine tuning pattern, thus causing each photosensitive drum to surface move with a stable speed. Due to this, the color drift due to the displacement of the dots of each color visual image can be reduced.

When a driving motor, which drives the respective image carrier, is constantly driven in the same speed mode (average speed per single rotation), the speed fluctuating pattern per single rotation of the image carrier due to the decentering of the driven gear etc. remains constant unless the image carrier is removed with the driven gear. However, if a linear speed setting of the image carrier is modified along when switching from a low speed printing mode to a high speed printing mode, because a rotation cycle of the image carrier is changed, the speed fluctuation pattern also changes. Detecting the speed fluctuation pattern for each mode increases a waiting time period of a user.

Further, in recent high image quality enabled devices, for curbing a marginal displacement of the dots due to minute expansion of components along with environmental variations or due to displacement of the components by an external force, a marginal linear speed difference is maintained between the respective image carriers. A misalignment detecting image that includes dots of various colors is periodically formed, sensors are used to detect a marginal displacement of the dots of each color in the misalignment detecting image, and the linear speed difference is corrected based on a detection result of the marginal displacement. However, the speed fluctuation pattern of each image carrier changes at the time of correcting the linear speed difference. During every correction of the linear speed difference, forming the speed-fluctuation detecting image and detecting the speed fluctuation pattern using the sensors significantly increases the waiting time period of the user.

SUMMARY OF THE INVENTION

It is an object of the present invention to at least partially solve the problems in the conventional technology.

An image forming apparatus according to one aspect of the present invention includes an image carrier on which an image is formed; a driving source that drives the image carrier; an image forming unit that forms the image on the image carrier based on image data; a transfer unit that transfers the image formed on the image carrier onto a transfer member; an image detecting unit that detects the image transferred onto the transfer member; and a control unit that controls the driving source, the image forming unit, and the transfer unit. The control unit executes a fluctuation-pattern detecting process of forming a speed-fluctuation detecting image formed of a plurality of predetermined visual images on the image carrier, while causing the image carrier to rotate at a standard linear speed, transferring the speed-fluctuation detecting image onto the transfer member, and detecting a speed fluctuation pattern per single rotation of the image carrier based on detection time period intervals detected by the image detecting unit, for each visual image in the speed-fluctuation detecting image, a fine-tuning-pattern determining process of determining a driving speed fine tuning pattern per single rotation of the image carrier of the driving source based on the speed fluctuation pattern, and an image forming process of forming the image based on the image data while driving the driving source based on the driving speed fine tuning pattern. A process of forming the image based on the image data while causing the image carrier to rotate at a nonstandard linear speed that differs from the standard linear speed is executed as the image forming process. A fine-tuning-pattern correcting process of correcting the driving speed fine tuning pattern based on the nonstandard linear speed is executed before the image forming process.

An image forming apparatus according to another aspect of the present invention includes an image carrier on which an image is formed; a driving source that drives the image carrier; an image forming unit that forms the image on the image carrier based on image data; a transfer unit that transfers the image formed on the image carrier onto a transfer member; an image detecting unit that detects the image transferred onto the transfer member; and a control unit that controls the driving source, the image forming unit, and the transfer unit. The control unit executes a fluctuation-pattern detecting process of forming a speed-fluctuation detecting image formed of a plurality of predetermined visual images on the image carrier, while causing the image carrier to rotate at a standard linear speed, transferring the speed-fluctuation detecting image onto the transfer member, and detecting a speed fluctuation pattern per single rotation of the image carrier based on detection time period intervals detected by the image detecting unit, for each visual image in the speed-fluctuation detecting image, a fine-tuning-pattern determining process of determining a driving speed fine tuning pattern per single rotation of the image carrier of the driving source based on the speed fluctuation pattern, and an image forming process of forming the image based on the image data while driving the driving source based on the driving speed fine tuning pattern. A process of forming the image based on the image data while causing the image carrier to rotate at a nonstandard linear speed that differs from the standard linear speed is executed as the image forming process. A fluctuation-pattern correcting process of correcting the speed fluctuation pattern based on the nonstandard linear speed is executed before the image forming process. A process of determining the driving speed fine tuning pattern based on the speed fluctuation pattern that is corrected by the fluctuation-pattern correcting process is executed as the fine-tuning-pattern determining process.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. A first embodiment of a printer that uses an electrophotographic method is explained below. The printer is used as an image forming apparatus to which the present invention is applied.

Figure 1:
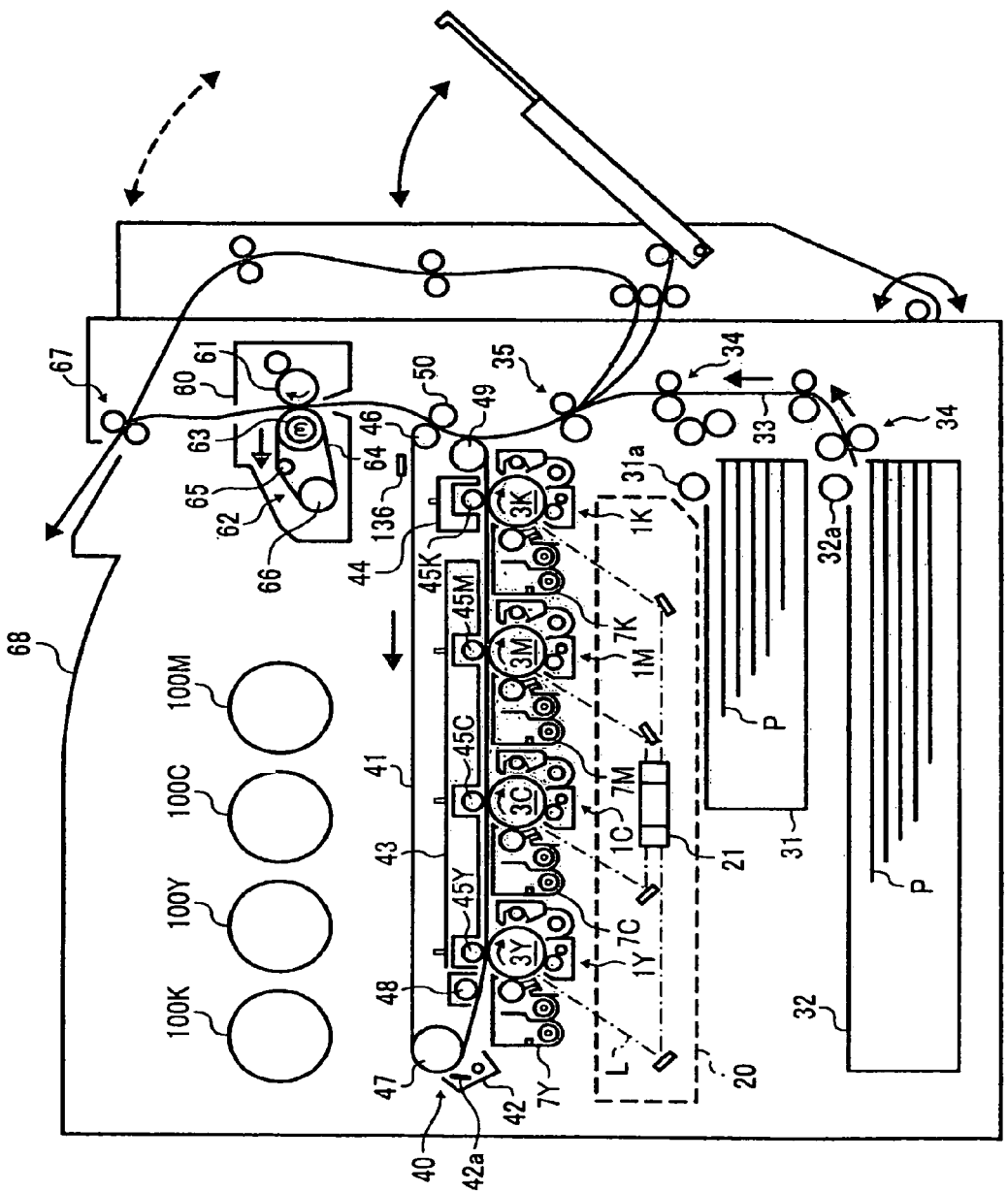
FIG. 1 is a schematic diagram of an overview of a printer according to a first embodiment of the present invention.
Figure 2:
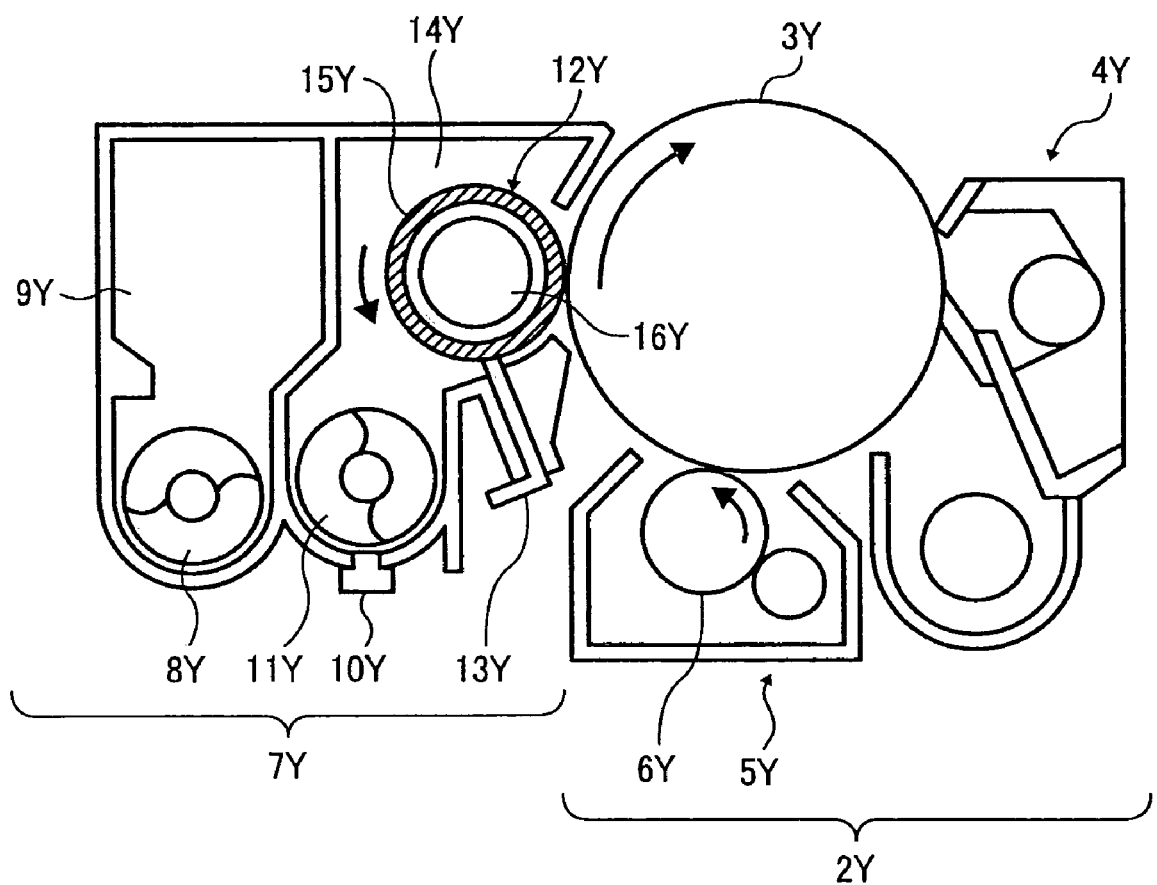
FIG. 2 is a schematic diagram of a Y processor of the printer.
Figure 3:
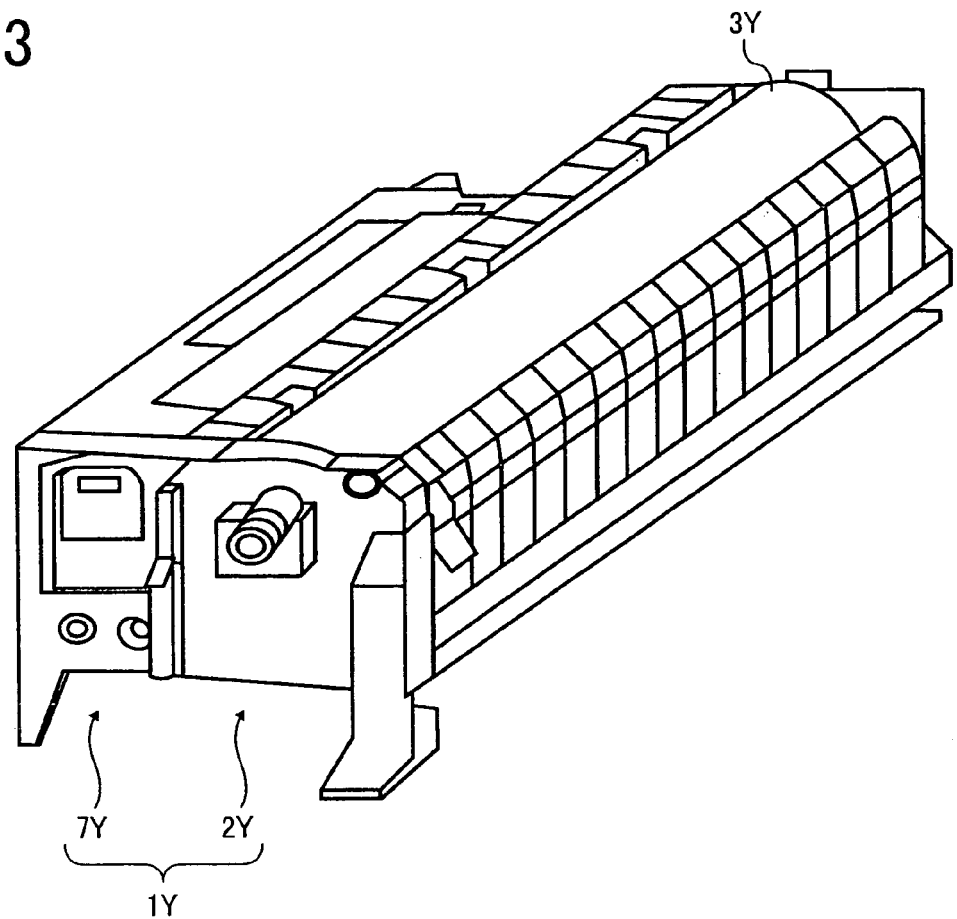
FIG. 3 is a perspective view of the Y processor.
Figure 4:
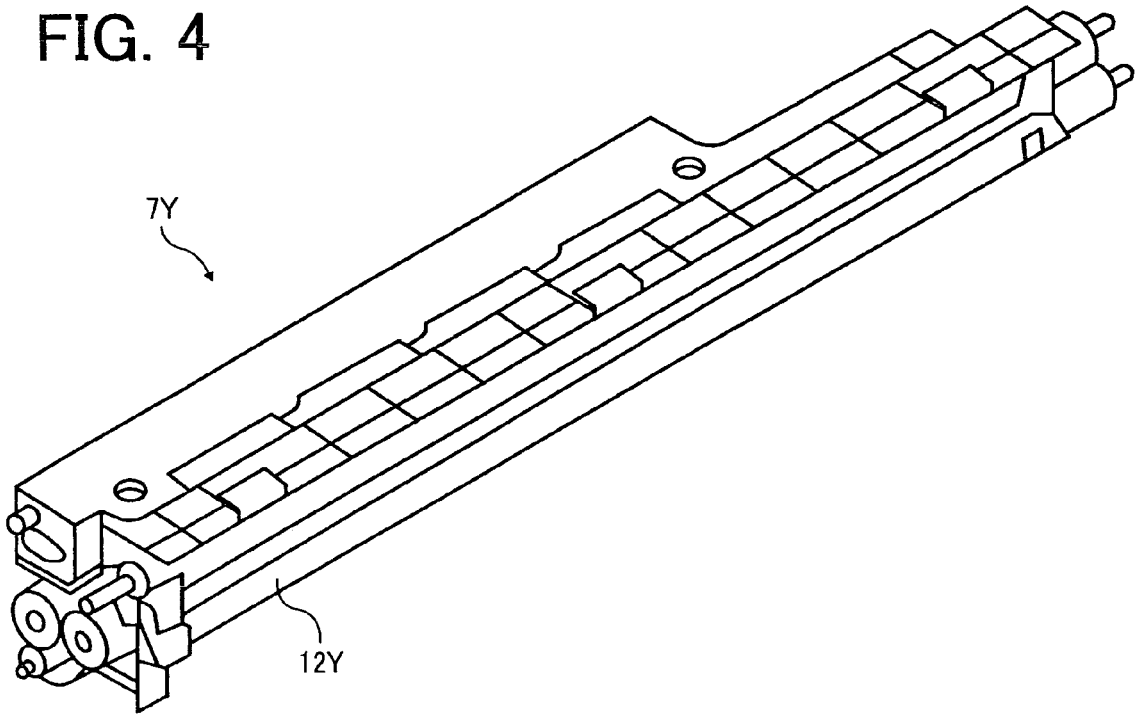
FIG. 4 is a perspective view of a developing unit of the Y processor.

FIG. 1 is a schematic diagram of an overview of the printer according to the first embodiment. The printer shown in FIG. 1 includes, as processors that execute an image forming process, four processors 1Y, 1C, 1M, and 1K for yellow (Y), cyan (C), magenta (M), and black (K) colors respectively. Although the processors 1Y, 1C, 1M, and 1K use different toners of Y, C, M, and K colors respectively as an image forming material that forms an image, the rest of the structure of the processors 1Y, 1C, 1M, and 1K is similar. The processor 1Y, which generates a Y toner image, is used as an example to explain the processors 1Y, 1C, 1M, and 1K. As shown in FIG. 2, the processor 1Y includes a photosensitive drum unit 2Y and a developing unit 7Y. As shown in FIG. 3, the photosensitive drum unit 2Y and the developing unit 7Y are integrally attached as the processor 1Y to a main body of the printer. However, as shown in FIG. 4, upon removing the processor 1Y from the main body of the printer, the developing unit 7Y can be removed from the photosensitive drum unit 2Y.

As shown in FIG. 2, the photosensitive drum unit 2Y includes a drum shaped photosensitive drum 3Y that is an image carrier and a latent image carrier, a drum cleaning device 4Y, a neutralizing unit (now shown), and a charging unit 5Y.

The charging unit 5Y uniformly charges a surface of the photosensitive drum 3Y that is rotated in a clockwise direction by a not shown driver. In the charging unit 5Y shown in FIG. 2, a charging roller 6Y, which is rotatably driven in an anticlockwise direction while being subjected to application of a charging bias by a not shown power source, is brought near the photosensitive drum 3Y to uniformly charge the photosensitive drum 3Y. Instead of using the charging roller 6Y, a charging brush can also be brought near the photosensitive drum 3Y. Further, the photosensitive drum 3Y can also be uniformly charged by using a charging unit method such as a scorotron type charging unit. The surface of the photosensitive drum 3Y, which is uniformly charged by the charging unit 5Y, is exposure scanned by a laser beam that is emitted from an optical writing unit, and bears a Y electrostatic latent image.

The developing unit 7Y which is a developing unit includes a first material housing unit 9Y in which a first transporting screw 8Y is arranged. The developing unit 7Y further includes a toner concentration sensor 10Y, a second transporting screw 11Y, a developing roll 12Y, a doctor blade 13Y, and a second material housing unit 14Y. The first material housing unit 9Y and the second material housing unit 14Y include therein a not shown developing material formed of a magnetic carrier and a negatively charged Y toner. The first transporting screw 8Y is rotatably driven by the not shown driver. Due to this, the first transporting screw 8Y transports the Y developing material, which is inside the first material housing unit 9Y, in a perpendicular direction to the plane of view from a front side towards a back side. Next, the Y developing material moves into the second material housing unit 14Y via a not shown linking aperture that is arranged on a partition wall between the first material housing unit 9Y and the second material housing unit 14Y.

The second transporting screw 11Y inside the second material housing unit 14Y is rotatably driven by the not shown driver. Due to this, the Y developing material is transported from the back side towards the front side with respect to FIG. 2. During transportation of the Y developing material, the toner concentration sensor 10Y, which is fixed on a bottom portion of the first material housing unit 9Y, detects a toner concentration of the Y developing material. The developing roll 12Y is arranged on the upper side of the second transporting screw 11Y that transports the developing material such that the developing roll 12Y is parallel to the second transporting screw 11Y. The developing roll 12Y includes a magnet roller 16Y inside a developing sleeve 15Y that is formed of a non-magnetic pipe that is rotatably driven in a counterclockwise direction. A portion of the Y developing material which is transported by the second transporting screw 11Y is scooped onto the surface of the developing sleeve 15Y due to a magnetic force of the magnet roller 16Y. Next, a layer thickness of the Y developing material is regulated by the doctor blade 13Y that is arranged at a predetermined gap from the developing sleeve 15Y that is a developing member. Next, the Y developing material is transported to a developing area opposite the photosensitive drum 3Y and the Y toner is caused to adhere to the Y electrostatic latent image on the photosensitive drum 3Y. Due to adhesion of the Y developing material, a visual image in the form of the Y toner image is formed on the photosensitive drum 3Y. Along with the rotations of the developing sleeve 15Y of the developing roll 12Y, the Y developing material, which has consumed the Y toner for developing the Y electrostatic latent image, is returned on the second transporting screw 11Y. Upon getting transported till a front side end with respect to FIG. 2, the Y developing material returns to inside the first material housing unit 9Y via the not shown linking aperture.

A detection result of permeability of the Y developing material using the toner concentration sensor 10Y is transmitted as voltage signals to the not shown controller. Because the permeability of the Y developing material indicates a correlation with the toner concentration of the Y developing material, the toner concentration sensor 10Y outputs a voltage of a value according to the toner concentration. The controller includes a random access memory (RAM). The RAM stores therein data of Y Vtref that is a target value of an output voltage from the toner concentration sensor 10Y. Similarly, the RAM stores therein data of C Vtref, M Vtref, and K Vtref that are the target values of the output voltages of the C, M, and K toner concentration sensors respectively that are mounted on the other developing units. In the Y developing unit 7Y, the value of the output voltage from the toner concentration sensor 10Y is compared to the Y Vtref and a not shown Y toner supplying device is driven only for a time period according to a comparison result. Driving the Y toner supplying device causes the first material housing unit 9Y to supply an appropriate amount of the Y toner to the Y developing material in which the Y toner concentration has reduced due to consumption of the Y toner for developing. Thus, the Y toner concentration of the Y developing material inside the second material housing unit 14Y is maintained within a predetermined range. A similar toner supply control is carried out for the developing materials inside the processors 1C, 1M, and 1K of the other colors.

The Y toner image that is formed on the photosensitive drum 3Y is intermediate transferred to an intermediate transfer belt that is explained later. The drum cleaning device 4Y of the photosensitive drum unit 2Y removes the toner that is remaining on the surface of the photosensitive drum 3Y after the photosensitive drum 3Y is subjected to an intermediate transfer process. Next, the neutralizing unit neutralizes the electric charge from the surface of the photosensitive drum 3Y that is subjected to a cleaning process mentioned earlier. Removing the electric charge initializes the surface of the photosensitive drum 3Y and the surface of the photosensitive drum 3Y becomes ready for the next image formation. As shown in FIG. 1, C, M, and K toner images are similarly formed on the photosensitive drums 3C, 3M, and 3K respectively in the respective processors 1C, 1M, and 1K of the other colors. The C, M, and K toner images thus formed are also intermediate transferred to the intermediate transfer belt.

An optical writing unit 20 is arranged on a lower side of the processors 1Y, 1C, 1M, and 1K. The optical writing unit 20 which is a latent image forming unit emits a laser beam L, based on the image data, on the photosensitive drums 3Y, 3C, 3M, and 3K of the processors 1Y, 1C, 1M, and 1K respectively. Due to this, Y, C, M, and K electrostatic latent images are formed on the photosensitive drums 3Y, 3C, 3M, and 3K respectively. The optical writing unit 20 uses a polygon mirror 21 which is rotatably driven by a motor to slant the laser beam L that is emitted from a light source and emits the laser beam L on the photosensitive drums 3Y, 3C, 3M, and 3K via a plurality of optical lenses and mirrors. Instead of using the optical writing unit 20 that includes the structure mentioned earlier, an optical writing unit that carries out optical scanning by a laser emitting diode (LED) array can also be used.

A first feeding cassette 31 and a second feeding cassette 32 are arranged on a lower side of the optical writing unit 20 such that the first feeding cassette 31 and the second feeding cassette 32 overlap in a vertical direction. A plurality of recording sheets P, which is a recording medium, are housed inside the first feeding cassette 31 and the second feeding cassette 32 in the form of a plurality of stacked bundles. A first feeding roller 31a and a second feeding roller 32a touch the uppermost recording sheet P. When the first feeding roller 31a is rotatably driven by the not shown driver in a counterclockwise direction, the uppermost recording sheet P inside the first feeding cassette 31 is ejected towards a feeding path 33 that is arranged such that the feeding path 33 extends in a vertical direction along a right side direction of the first feeding cassette 31. Further, when the second feeding roller 32a is rotatably driven in a counterclockwise direction by the not shown driver, the uppermost recording sheet P inside the second feeding cassette 32 is ejected towards the feeding path 33. A pair of transporting rollers 34 is arranged inside the feeding path 33. The recording sheet P, which is transmitted to the feeding path 33, is sandwiched between the transporting rollers 34 and transported from the lower side to the upper side inside the feeding path 33.

A pair of resist rollers 35 is arranged at the end of the feeding path 33. When the recording sheet P, which is transmitted from the transporting rollers 34, is sandwiched between the resist rollers 35, the resist rollers 35 immediately stop rotating. Next, the resist rollers 35 transmit the recording sheet P at an appropriate timing towards a secondary transfer nip that is explained later.

A transfer unit 40 is arranged on the upper side of the processors 1Y, 1C, 1M, and 1K. An intermediate transfer belt 41, which is an endlessly moving member and a transfer member, is stretched on the transfer unit 40 and is endlessly moved in a counterclockwise direction by the transfer unit 40. Apart from the intermediate transfer belt 41, the transfer unit 40 also includes a belt cleaning unit 42, a first bracket 43, and a second bracket 44. The transfer unit 40 further includes primary transferring rollers 45Y, 45C, 45M, and 45K, a secondary transfer backup roller 46, a driving roller 47, an auxiliary roller 48, and a tension roller 49. The intermediate transfer belt 41, which is stretched on the primary transferring rollers 45Y, 45C, 45M, 45K, the secondary transfer backup roller 46, the driving roller 47, the auxiliary roller 48, and the tension roller 49, is endlessly moved in a counterclockwise direction. The primary transferring rollers 45Y, 45C, 45M, 45K sandwich the endlessly moving intermediate transfer belt 41 between the primary transferring rollers 45Y, 45C, 45M, 45K and the photosensitive drums 3Y, 3C, 3M, and 3K to form four primary transfer nips. A transfer bias of a reverse polarity (for example, a positive polarity) is applied to a reverse surface (inner peripheral surface of a loop) of the intermediate transfer belt 41. When the endlessly moving intermediate transfer belt 41 sequentially passes the primary transfer nips for Y, C, M, and K colors, the Y, C, M, and K toner images on the respective photosensitive drums 3Y, 3C, 3M, and 3K are superposed and primary transferred onto the upper surface of the intermediate transfer belt 41. Due to this, a toner image (hereinafter, "four color toner image") which includes four superposed colors is formed on the intermediate transfer belt 41.

The secondary transfer backup roller 46 sandwiches the intermediate transfer belt 41 between the secondary transfer backup roller 46 and a secondary transferring roller 50 that is arranged on the outer side of the loop of the intermediate transfer belt 41, thus forming a secondary transfer nip. The resist rollers 35 explained earlier transfer, at a synchronous timing with the four color toner image on the intermediate transfer belt 41, the recording sheet P sandwiched between the resist rollers 35 towards the secondary transfer nip. Due to a secondary transfer electric field, which is formed between the secondary transferring roller 50 that is subjected to the application of a secondary transfer bias and the secondary transfer backup roller 46, and the secondary transfer nip, the four color toner image on the intermediate transfer belt 41 is secondary transferred on the recording sheet P inside the secondary transfer nip. Next, the four color toner image combines with the white color of the recording sheet P and becomes a full color toner image.

Transfer residual toner that is not transferred to the recording sheet P is adhering on the intermediate transfer belt 41 that has passed the secondary transfer nip. The belt cleaning unit 42 cleans the transfer residual toner from the intermediate transfer belt 41. A cleaning blade 42a of the belt cleaning unit 42 touches the upper surface of the intermediate transfer belt 41. The transfer residual toner is scraped and removed by the cleaning blade 42a.

Along with turning on and turning off of driving power of a not shown solenoid, the first bracket 43 of the transfer unit 40 oscillates at a predetermined rotation angle centered on a rotation axial line of the auxiliary roller 48. In the printer according to the present invention, for forming a monochromatic image, the first bracket 43 is marginally rotated in a counterclockwise direction by driving the solenoid. A marginal rotation of the first bracket 43 causes the respective primary transferring rollers 45Y, 45C, and 45M to revolve in a counterclockwise direction centered on the rotation axial line of the auxiliary roller 48. Due to this, the intermediate transfer belt 41 is separated from the respective photosensitive drums 3Y, 3C, and 3M. Thus, among the respective Y, C, M, and K processors 1Y, 1C, 1M, and 1K, only the K processor 1K is driven and the monochromatic image is formed. Driving only the K processor 1K enables to avoid wear and tear of the respective Y, C, and M processors 1Y, 1C, and 1M resulting from unnecessary driving the Y, C, and M processors 1Y, 1C, and 1M at the time of monochromatic image formation.

A fixing unit 60 is arranged on the upper side of the secondary transfer nip. The fixing unit 60 includes a pressing and heating roller 61 and a fixing belt unit 62. The pressing and heating roller 61 internally includes a heating source such as a halogen lamp. The fixing belt unit 62 includes a heating roller 63, a fixing belt 64, a tension roller 65, a driving roller 66, and a not shown temperature sensor. The heating roller 63 internally includes a heating source such as a halogen lamp. The fixing belt 64 is a fixing member. The endlessly shaped fixing belt 64, which is stretched by the heating roller 63, the tension roller 65, and the driving roller 66, is endlessly moved in a counterclockwise direction. When endlessly moving, the fixing belt 64 is heated from the back side by the heating roller 63. The pressing and heating roller 61, which is rotatably driven in a clockwise direction, touches from the front side, a portion of the heated fixing belt 64 that is wound on the heating roller 63. Due to this, a fixing nip is formed where the pressing and heating roller 61 and the fixing belt 64 touch each other.

The not shown temperature sensor is arranged on the loop outer side of the fixing belt 64 such that the temperature sensor is at a predetermined gap on the opposite side of the front surface of the fixing belt 64. The temperature sensor detects a surface temperature of the fixing belt 64 immediately before the fixing belt 64 enters the fixing nip. A detection result is transmitted to a not shown fixing power source circuit. Based on the detection result by the temperature sensor, the fixing power source circuit exercises on/off control of a power supply to a heat source that is included inside the heating roller 63 and a heat source that is included inside the pressing and heating roller 61. Due to this, the surface temperature of the fixing belt 64 is maintained at 140° C.

As shown in FIG. 1, the recording sheet P, which has passed the secondary transfer nip, is separated from the intermediate transfer belt 41 and transmitted to inside of the fixing unit 60. The recording sheet P is transported from the lower side towards the upper side while being sandwiched in the fixing nip inside the fixing unit 60. During transportation, the recording sheet P is heated and pressed by the fixing belt 64 and the full color toner image is fixed onto the recording sheet P.

The recording sheet P, which is subjected to a fixing process mentioned earlier, is passed between a pair of ejecting rollers 67 and ejected outside the printer. A stacking unit 68 is formed on the upper surface of a chassis of the main body of the printer. The recording sheet P, which is ejected outside the printer by the ejecting rollers 67, is sequentially stalked in the stacking unit 68.

Four toner cartridges 100Y, 100C, 100M, and 100K, which house therein the Y, C, M, and K toners respectively, are arranged on the upper side of the transfer unit 40. The Y, C, M, and K toners inside the toner cartridges 100Y, 100C, 100M, and 100K are appropriately supplied to the developing units 7Y, 7C, 7M, and 7K of the processors 1Y, 1C, 1M, and 1K respectively. The toner cartridges 10Y, 100C, 100M, and 100K can be attached to and removed from the main body of the printer separately from the processors 1Y, 1C, 1M, and 1K.

Figure 5:
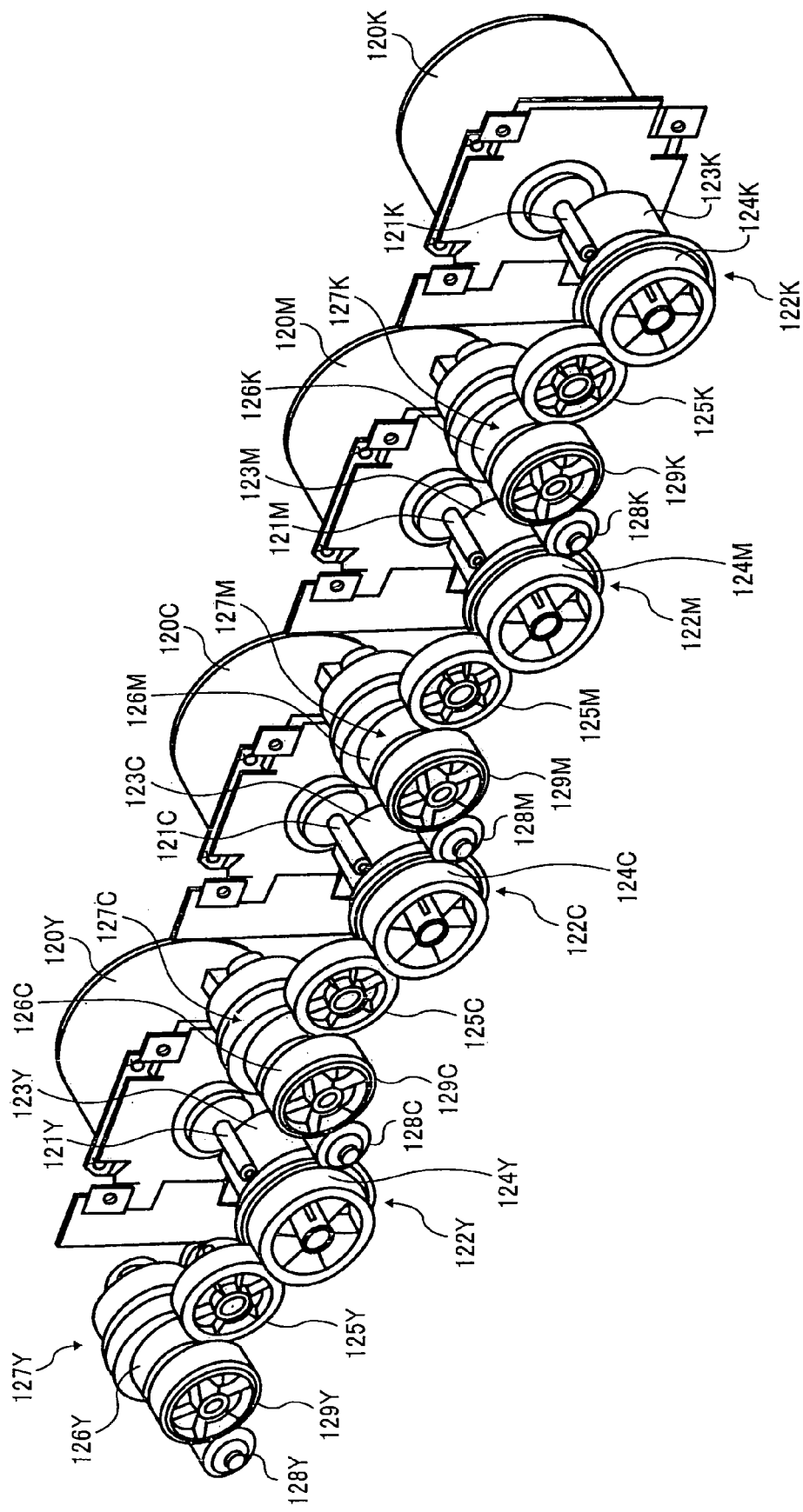
FIG. 5 is a perspective view of a printer side drive transporting unit that is a drive transporting system fixed inside a chassis of the printer.
Figure 6:
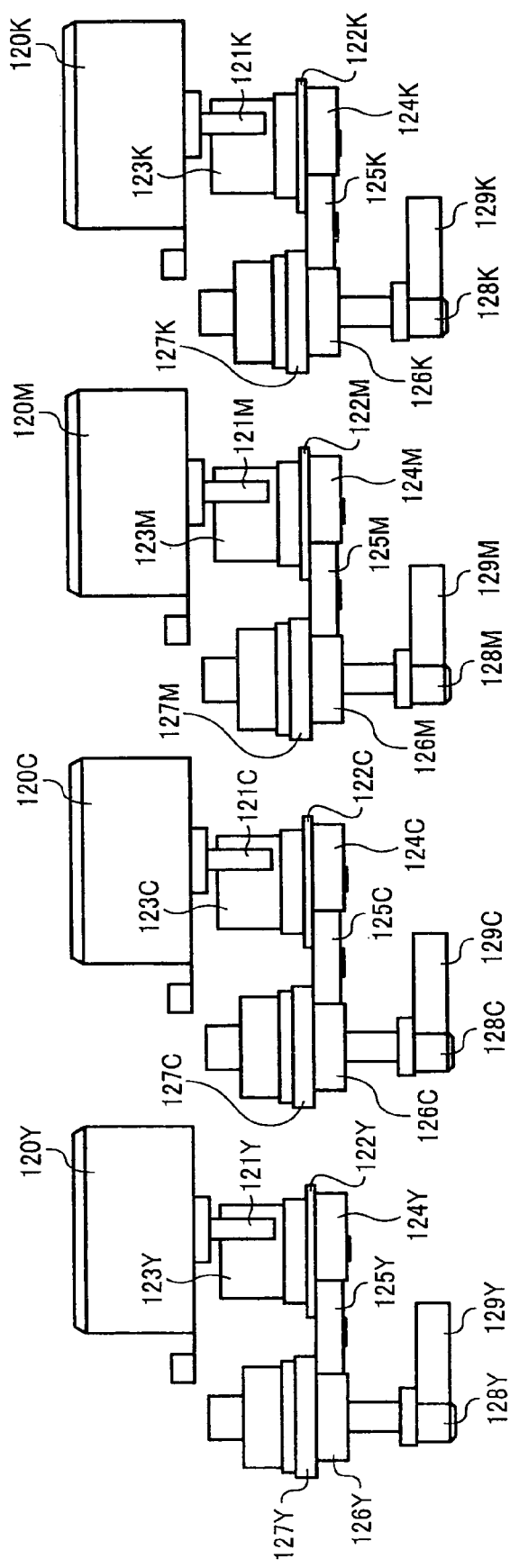
FIG. 6 is a schematic diagram of the printer side drive transporting unit viewed from the upper side.

FIG. 5 is a perspective view of a printer side drive transporting unit that is a drive transporting system fixed inside the chassis of the printer. FIG. 6 is a schematic diagram of the printer side drive transporting unit viewed from the upper side. A supporting plate is vertically arranged inside the chassis of the printer. Four process driving motors 120Y, 120C, 120M, and 120K are fixed to the supporting plate. Drive gears 121Y, 121C, 121M, and 121K are fixed on a rotation axis of the respective process driving motors 120Y, 120C, 120M, and 120K that are driving sources. Developing gears 122Y, 122C, 122M, and 122K are included on the lower side of the rotation axis of the process driving motors 120Y, 120C, 120M, and 120K such that the developing gears 122Y, 122C, 122M, and 122K can slide and rotate while engaging with a not shown fixed shaft that projects from the supporting plate. The developing gears 122Y, 122C, 122M, and 122K include first gears 123Y, 123C, 123M, and 123K and second gears 124Y, 124C, 124M, and 124K that rotate on the same rotation axial line with respect to each other. The second gears 124Y, 124C, 124M, and 124K are positioned towards an end side of the rotation axis of the process driving motors 120Y, 120C, 120M, and 120K compared to the first gears 123Y, 123C, 123M, and 123K. The first gears 123Y, 123C, 123M, and 123K of the developing gears 122Y, 122C, 122M, and 122K mesh with the drive gears 121Y, 121C, 121M, and 121K of the process driving motors 120Y, 120C, 120M, and 120K. Thus, the developing gears 122Y, 122C, 122M, and 122K slidably rotate on the fixed shaft due to rotations of the process driving motors 120Y, 120C, 120M, and 120K.

The process driving motors 120Y, 120C, 120M, and 120K, which are driving sources, are formed of direct current (DC) servo motors that are a type of a DC brushless servo motor. A speed reduction ratio of the drive gears 121Y, 121C, 121M, and 121K and photosensitive drum gears 133Y, 133C, 133M, and 133K is 1/20. Only one speed reduction step is used for reducing the speed from the drive gears 121Y, 121C, 121M, and 121K until reaching the photosensitive drum gears 133Y, 133C, 133M, and 133K. Apart from enabling to reduce a number of components and reduce a cost of the printer, using only two gears also enables to reduce meshing errors and transporting errors due to decentering. To obtain a comparatively large speed reduction ratio of 1/20 using one step speed reduction, a diameter of the photosensitive drum gears 133Y, 133C, 133M, and 133K needs to be greater than a diameter of the photosensitive drums 3Y, 3C, 3M, and 3K. Using the photosensitive drum gears 133Y, 133C, 133M, and 133K, which include the large diameter, also enables to reduce pitch errors on a photosensitive drum surface corresponding to meshing of one gear, thus enabling to reduce the influence of uneven print concentration (banding) in a secondary scanning direction. From a relation between a target speed and motor attributes of the photosensitive drums 3Y, 3C, 3M, and 3K, the speed reduction ratio is calculated based on a speed area that enables to get high efficiency and high rotational accuracy.

First relay gears 125Y, 125C, 125M, and 125K are arranged on the left side of the developing gears 122Y, 122C, 122M, and 122K such that the first relay gears 125Y, 125C, 125M, and 125K slidably rotate while engaging with the not shown fixed shaft. The first relay gears 125Y, 125C, 125M, and 125K mesh with the second gears 124Y, 124C, 124M, and 124K of the developing gears 122Y, 122C, 122M, and 122K, thus receiving a rotary driving force from the developing gears 122Y, 122C, 122M, and 122K, and slidably rotate on the fixed shaft. The second gears 124Y, 124C, 124M, and 124K mesh with the first relay gears 125Y, 125C, 125M, and 125K at the upstream side in a drive transportation direction. Clutch input gears 126Y, 126C, 126M, and 126K mesh with the first relay gears 125Y, 125C, 125M, and 125K at the downstream side in the drive transportation direction. The clutch input gears 126Y, 126C, 126M, and 126K are supported by developing clutches 127Y, 127C, 127M, and 127K. When the not shown controller exercises on/off control of a power source supply, the developing clutches 127Y, 127C, 127M, and 127K link the rotary driving force of the clutch input gears 126Y, 126C, 126M, and 126K to a clutch shaft or cause the clutch input gears 126Y, 126C, 126M, and 126K to rotate idly. Clutch output gears 128Y, 128C, 128M, and 128K are fixed at the end side of the clutch shaft of the developing clutches 127Y, 127C, 127M, and 127K. When power is supplied to the developing clutches 127Y, 127C, 127M, and 127K, the rotary driving force of the clutch input gears 126Y, 126C, 126M, and 126K is linked to the clutch shaft and the clutch output gears 128Y, 128C, 128M, and 128K start rotating. When power supply to the developing clutches 127Y, 127C, 127M, and 127K is turned off, even if the process driving motors 120Y, 120C, 120M, and 120K rotate, because the clutch input gears 126Y, 126C, 126M, and 126K rotate idly on the clutch shaft, the clutch output gears 128Y, 128C, 128M, and 128K stop rotating.

Second relay gears 129Y, 129C, 129M, and 129K are arranged on the left side of the clutch output gears 128Y, 128C, 128M, and 128K such that the second relay gears 129Y, 129C, 129M, and 129K can slidably rotate while engaging with the not shown fixed shaft. The second relay gears 129Y, 129C, 129M, and 129K rotate while meshing with the clutch output gears 128Y, 128C, 128M, and 128K.

Figure 7:
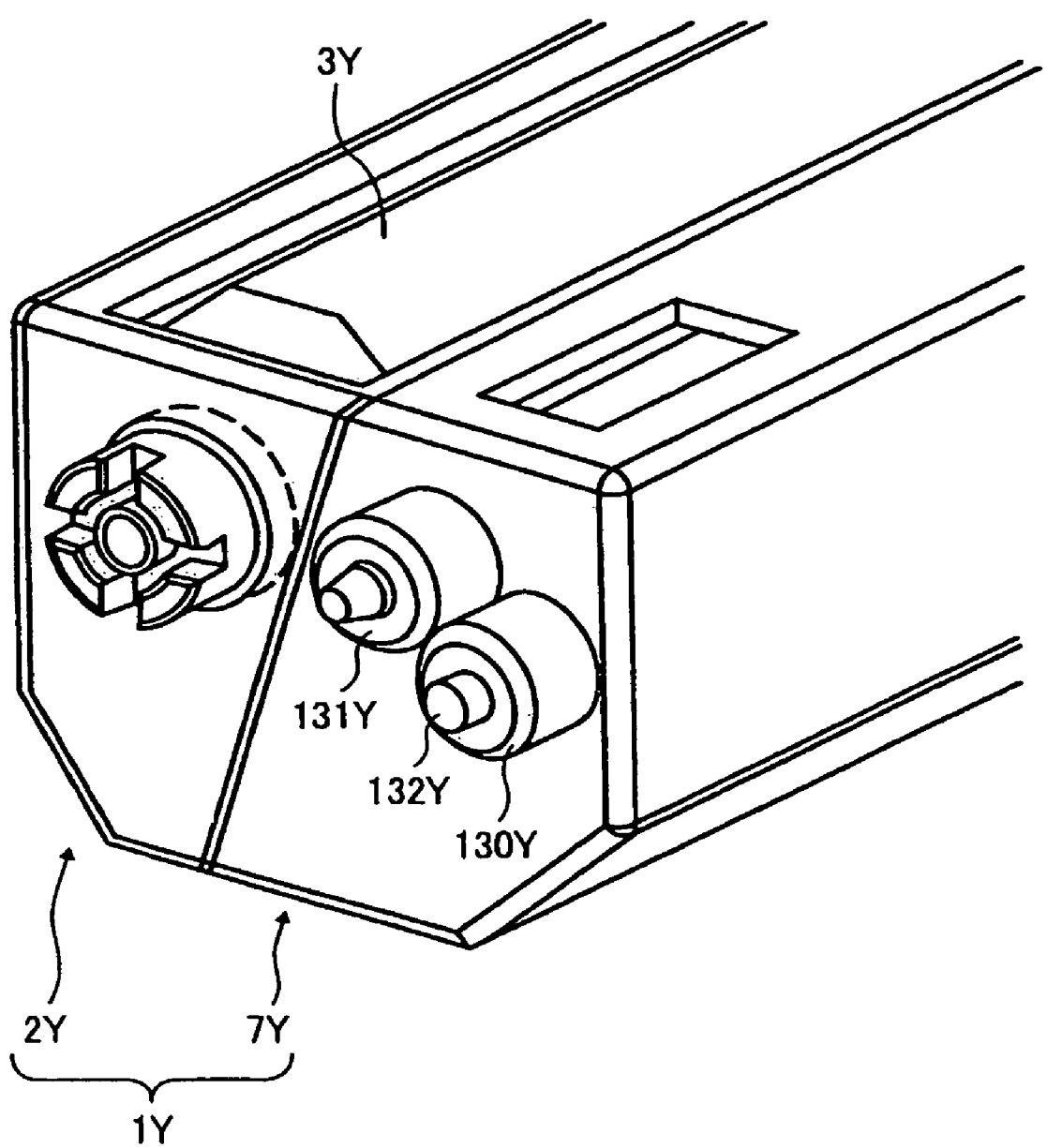
FIG. 7 is a partial schematic diagram of an end portion of the Y processor.

FIG. 7 is a partial schematic diagram of an end portion of the Y processor 1Y. A shaft member of the developing sleeve 15Y inside a casing of the developing unit 7Y penetrates a casing side surface and protrudes outside. A sleeve upper gear 131Y is fixed to the protruding shaft member portion. A fixed shaft 132Y is arranged in a protruding manner on the casing side surface. A third relay gear 130Y can rotatably slide while engaging with the fixed shaft 132Y and meshes with the sleeve upper gear 131Y.

When the Y processor 1Y is set in the main body of the printer, apart from the sleeve upper gear 131Y, the second relay gear 129Y shown in FIGS. 5 and 6 also meshes with the third relay gear 130Y. The rotary driving force of the second relay gear 129Y is sequentially transported to the third relay gear 130Y and the sleeve upper gear 131Y and the developing sleeve 15Y is rotatably driven.

Transportation of the rotary driving force to the Y processor 1Y is explained with reference to FIGS. 5 to 7. However, the rotary driving force is similarly transported to the developing sleeves 15C, 15M, and 15K in the respective processors 1C, 1M, and 1K of the other colors.

Only one end portion of the Y processor 1Y is shown in FIG. 7. However, a shaft member on the other end of the developing sleeve 15Y penetrates the casing side surface at the other end and protrudes outside. A not shown sleeve lower gear is fixed to the protruding portion of the shaft member. Similarly, the shaft members of the first transporting screw 8Y and the second transporting screw 11Y shown in FIG. 2 also penetrate the casing side surface on the other end and protrude outside. A first screw gear and a second screw gear are fixed to the protruding ends of the respective shaft members. When the developing sleeve 15Y rotates due to drive transportation by the sleeve upper gear 131Y, the sleeve lower gear at the other end also rotates along with the rotation of the sleeve upper gear 131Y. Due to this, the second transporting screw 11Y, which receives the driving force from the second screw gear that is meshing with the sleeve lower gear, also rotates. Similarly, the first transporting screw 8Y, which receives the driving force from the first screw gear that is meshing with the second screw gear, also rotates. The processors 1C, 1M, and 1K of the other colors also include a similar mechanism.

Thus, each of the processors 1Y, 1C, 1M, and 1K includes a corresponding developing gear cluster that includes the drive gear 121, the developing gear 122, the first relay gear 125, the clutch input gear 126, the clutch output gear 128, the second relay gear 129, the third relay gear 130, the sleeve upper gear 131, the sleeve lower gear, the second screw gear, and the first screw gear.

Figure 8:
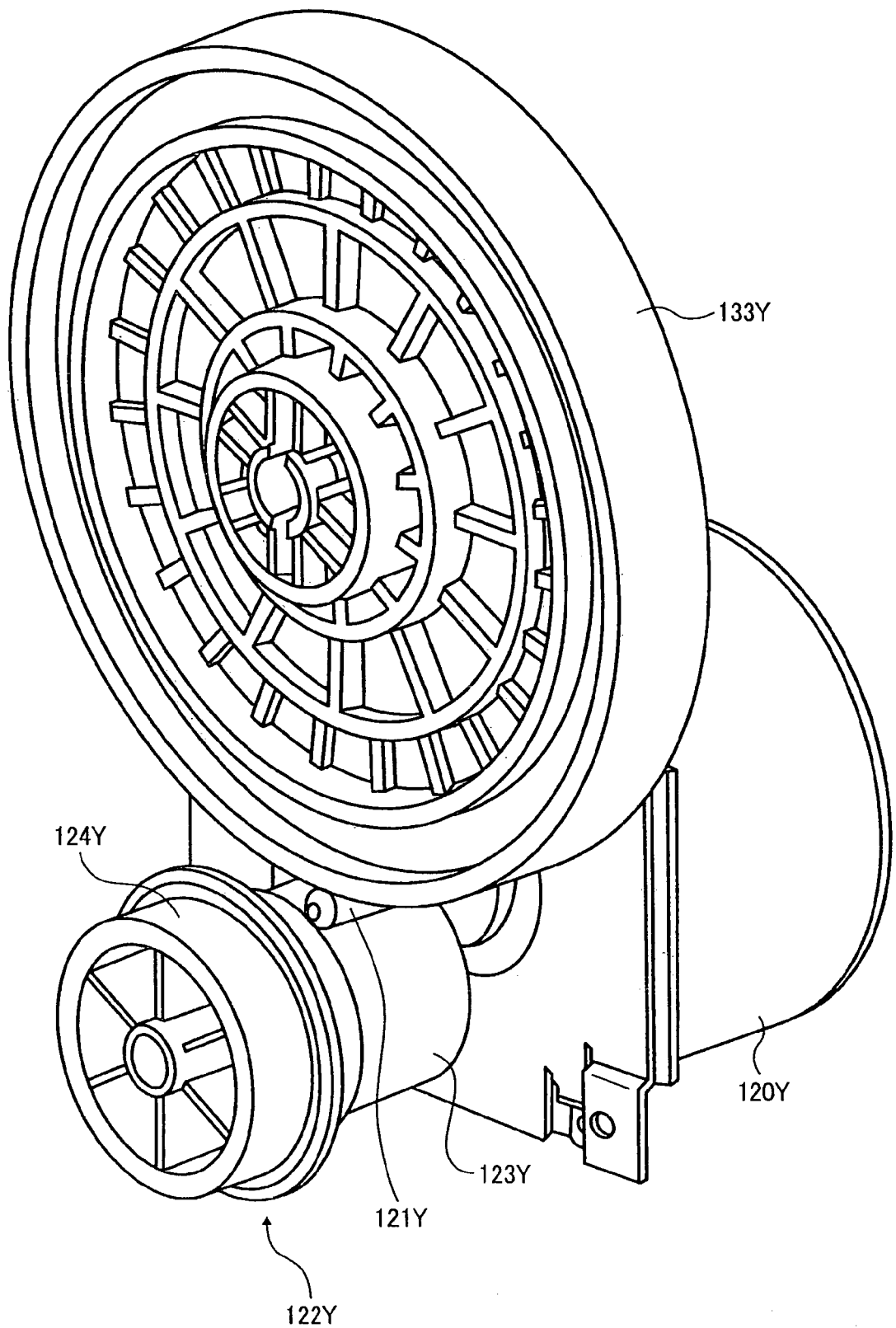
FIG. 8 is a schematic diagram of a Y photosensitive drum gear and a peripheral structure of the Y photosensitive drum gear in the printer.

FIG. 8 is a schematic diagram of the photosensitive drum gear 133Y and a peripheral structure of the photosensitive drum gear 133Y. As shown in FIG. 8, apart from the first gear 123Y of the developing gear 122Y, a latent image gear in the form of the photosensitive drum gear 133Y is also meshing with the drive gear 121Y. The photosensitive drum gear 133Y is rotatably supported, as a drive transporting rotating member, on the printer side drive transporting unit. A diameter of the photosensitive drum gear 133Y is greater than the diameter of the photosensitive drum 3Y. Upon rotating the process driving motor 120Y, the rotary driving force of the process driving motor 120Y is transmitted from the drive gear 121Y to the photosensitive drum gear 133Y at a reduced speed. The processors 1C, 1M, and 1K of the other colors also include a similar mechanism. Thus, in the printer according to the present invention, each of the processors 1Y, 1C, 1M, and 1K includes a corresponding latent image gear cluster that includes the drive gear 121 and the photosensitive drum gear 133.

A rotating shaft of the photosensitive drums 3 of the processors 1 and the photosensitive drum gears 133, which are supported on the main body of the printer, are linked by a coupling that is fixed on end portions of the rotating shaft of the photosensitive drums 3. Further, for all the colors, the developing gears 122 can also be driven by using developing motors that differ from the photosensitive drum gears 133.

Figure 9:
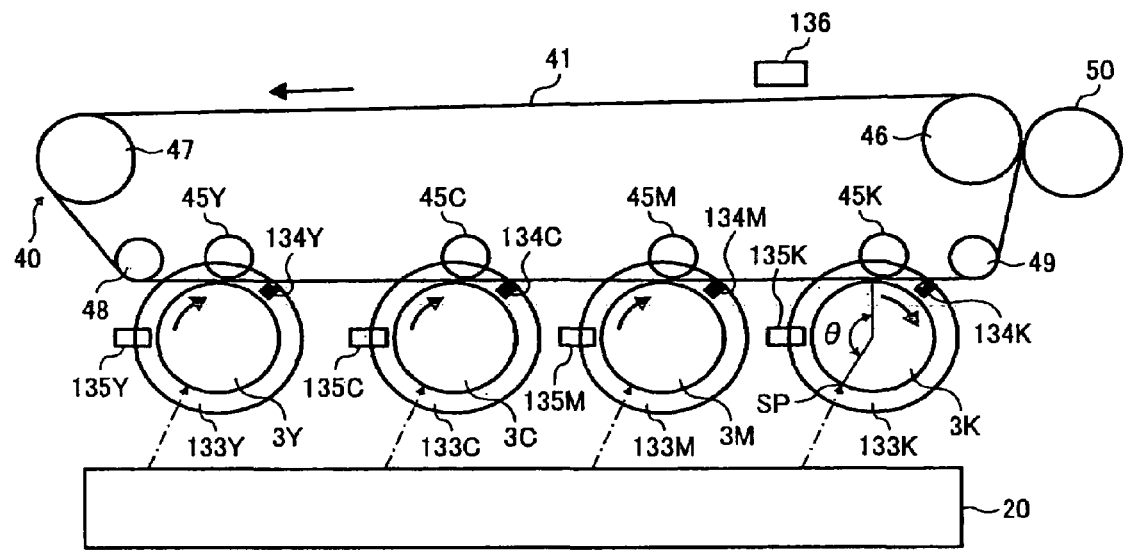
FIG. 9 is a schematic diagram of photosensitive drums, a transfer unit, and an optical writing unit that are included in the printer.

FIG. 9 is a schematic diagram of the photosensitive drums 3Y, 3C, 3M, and 3K, the transfer unit 40, and the optical writing unit 20. Markings 134Y, 134C, 134M, and 134K are attached at predetermined portions to the respective photosensitive drum gears 133Y, 133C, 133M, and 133K that transport the rotary driving force to the respective photosensitive drums 3Y, 3C, 3M, and 3K. Every time the photosensitive drum gears 133Y, 133C, 133M, and 133K carry out a single rotation, position sensors 135Y, 135C, 135M, and 135K that are formed of photo sensors detect the markings 134Y, 134C, 134M, and 134K at predetermined timings. Due to this, for each rotation of the photosensitive drums 3Y, 3C, 3M, and 3K, the position sensors 135Y, 135C, 135M, and 135K detect the timings corresponding to the predetermined rotation angles.

An optical sensor 136, which includes two not shown reflecting photo sensors that are arranged at a predetermined distance in a width direction of the intermediate transfer belt 41, is arranged on the upper side of the transfer unit 40 such that the optical sensor 136 is positioned opposite the upper stretched surface of the intermediate transfer belt 41 at a predetermined gap.

Generally, a position and a size of each of the processors 1Y, 1C, 1M, and 1K in the image forming apparatus marginally change due to a change in an internal temperature of the image forming apparatus or due to addition of external force. Such a change cannot be avoided. For example, upon carrying out operations such as resetting a paper jam, substituting the components for maintenance, or moving the image forming apparatus, external force is added to the processors 1Y, 1C, 1M, and 1K. Upon addition of external force or occurrence of a change in the internal temperature of the image forming apparatus, an optical path of the laser beam used by the optical writing unit 20 marginally changes. Due to this, a superposing precision of the toner images, which are formed by the processors 1Y, 1C, 1M, and 1K, deteriorates. To overcome the drawback, in the printer according to the present invention, a timing correcting process is executed immediately after inserting a power supply switch or after lapse of a predetermined time period. Thus, a superposing misalignment of the toner images of various colors is prevented.

Figure 10:
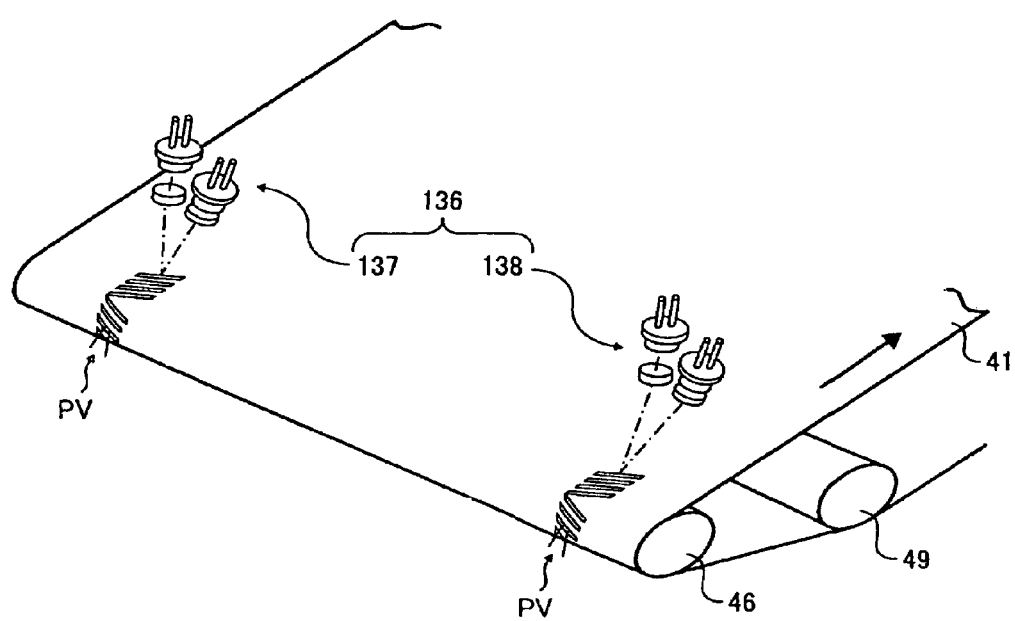
FIG. 10 is a schematic diagram of a portion of an intermediate transfer belt along with an optical sensor in the printer.

FIG. 10 is a schematic diagram of a portion of the intermediate transfer belt 41 along with the optical sensor 136. Immediately after the not shown power supply switch is turned on or at the predetermined timing such as after each lapse of the predetermined time period, the not shown controller of the printer according to the present invention carries out the timing correcting process. In the timing correcting process, misalignment detecting image PV, which include a plurality of toner images, are formed at one end and the other end in the width direction of the intermediate transfer belt 41. The optical sensor 136, which includes a first optical sensor 137 and a second optical sensor 138, is arranged on the upper side of the intermediate transfer belt 41. The first optical sensor 137 causes light emitted by a light emitter to pass through a condensing lens, causes the light to be reflected on the surface of the intermediate transfer belt 41, and receives the reflected light using a light receiver. Next, the first optical sensor 137 outputs the voltage according to a received light amount. When the toner images inside the misalignment detecting image PV, which is formed on one end of the intermediate transfer belt 41, pass directly under the first optical sensor 137, the received light amount due to the light receiver of the first optical sensor 137 significantly changes. Due to this, the first optical sensor 137 detects the toner images and causes a significant change in the value of the output voltage from the light receiver. Similarly, the second optical sensor 138 detects each toner image inside the misalignment detecting image PV that is formed on the other end of the intermediate transfer belt 41. Thus, the first optical sensor 137 and the second optical sensor 138 function as detectors that detect each toner image inside the misalignment detecting image PV. The LED, which includes the amount of light that enables to generate the reflected light that is necessary for detecting the toner images, is used as the light emitter. A charge coupled device (CCD), which includes a large number of linearly arranged light receiving elements, is used as the light receiver.

Detecting each toner image inside the misalignment detecting image PV, which are formed on both the ends in the width direction of the intermediate transfer belt 41, enables to regulate a position of a main scanning direction (a scanning direction by the laser beam) in each toner image, a position of a secondary scanning direction (a belt movement direction), a magnification error of the main scanning direction, and a skew from the main scanning direction. Along with the endless movement of the intermediate transfer belt 41, the misalignment detecting image PV formed on the intermediate transfer belt 41 are transported to a position opposite the optical sensor 136. While being transported, the misalignment detecting image PV passes a position opposite the secondary transferring roller 50. If the secondary transferring roller 50 is touching the intermediate transfer belt 41 and forming the secondary transfer nip, the misalignment detecting image PV on the intermediate transfer belt 41 touch the secondary transferring roller 50 and get transferred onto the surface of the secondary transferring roller 50. In the printer according to the present invention, before executing the timing correcting process, a not shown roller separating mechanism is driven to separate the secondary transferring roller 50 from the intermediate transfer belt 41. Due to this, a transfer of the misalignment detecting image PV onto the secondary transferring roller 50 can be avoided. The secondary transferring roller 50 is similarly separated from the intermediate transfer belt 41 when forming a speed-fluctuation detecting image that is explained later.

Figure 11:
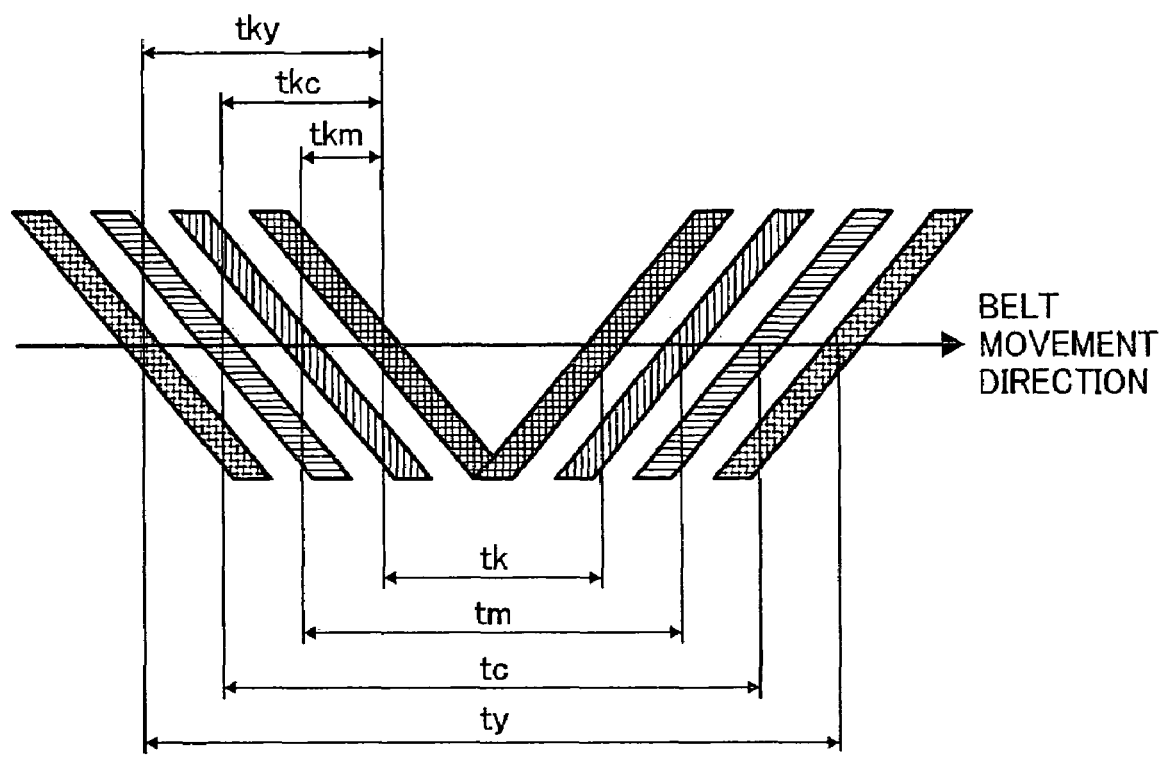
FIG. 11 is a schematic diagram of a misalignment detecting image.

As shown in FIG. 11, the toner images of Y, C, M, and K colors are tilted approximately 45° from the main scanning direction and arranged at a predetermined pitch in the belt movement direction that is the secondary scanning direction to form a line pattern cluster called a chevron batch that is used as the misalignment detecting image PV. Detection time period difference, with respect to the K toner image, are read for the Y, C, and M toner images inside the misalignment detecting image PV. As shown in FIG. 11, a vertical direction with respect to a paper surface is the main scanning direction. After arranging the Y, C, M, and K toner images sequentially from the left, K, M, C, and Y toner images, which are positioned 90° apart from the Y, C, M, and K toner images, are further arranged. Based on a difference between a measured value and a logical value for detection time period differences tyk, tck, and tmk with respect to K that is a standard color, a displacement amount of each toner image in the secondary scanning direction can be calculated. Next, based on the displacement amount, an optical-writing start timing is corrected for every alternate surface of the polygon mirror 21 of the optical writing unit 20, in other words, by treating one scanning line pitch as one unit to curb the superposing misalignment of each toner image in the secondary scanning direction. Further, based on a difference between a measured value and a logical value for detection time period differences tk, tm, tc, and ty of the two toner images that are of the same color and that are positioned 90° apart from each other, a displacement amount of each toner image in the main scanning direction can be calculated. Based on a difference between the displacement amounts in the secondary scanning direction at the two end portions of the intermediate transfer belt 41, a tilt (skew) of each toner image from the main scanning direction can be calculated. Further, based on a result of the tilt calculation mentioned earlier, a not shown lens tilt regulating mechanism, which regulates a tilt of a not shown toroidal lens inside the optical writing unit 20, is driven to reduce the tilt of each toner image from the main scanning direction. When carrying out the corrections mentioned earlier, parameters of Y, C, and M colors are modified by treating K color as the standard.

Figure 12:
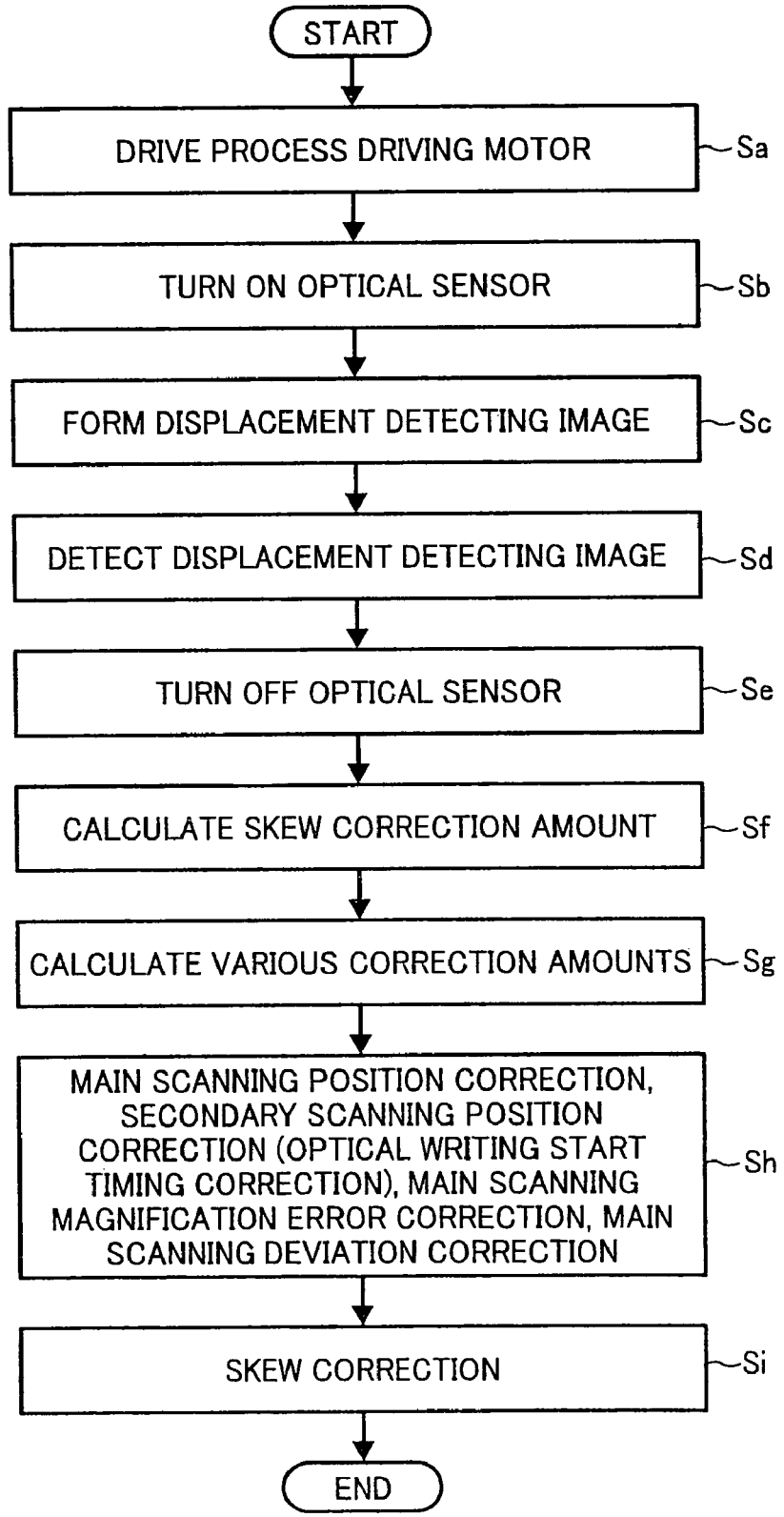
FIG. 12 is a flowchart of a timing correcting process that is executed by a controller of the printer.

FIG. 12 is a flowchart of the timing correcting process that is executed by the controller of the printer according to the present invention. In the timing correcting process, after the controller starts driving the process driving motors 120Y, 120C, 120M, and 120K (step a, hereinafter a step is indicated by "S"), the optical sensor 136 is turned on (Sb). Next, after forming the misalignment detecting image PV on the intermediate transfer belt 41 (Sc), the misalignment detecting image PV are detected by the optical sensor 136 (Sd). After the optical sensor 136 is turned off (Se), a skew correction amount, a main scanning position correction amount, a secondary scanning position correction amount, a main scanning magnification error correction amount, and a main scanning deviation correction amount are calculated for the Y, C, and M colors based on a detection result of the misalignment detecting image PV (Sf, Sg). Next, based on various correction amounts, the controller carries out a main scanning position correction, a secondary scanning position correction (optical-writing start timing correction), a main scanning magnification error correction, a main scanning deviation correction, and a skew correction (Sh, Si).

In the printer according to the present invention, among the Y, C, M, and K colors, the K color is treated as the standard color and among the photosensitive drums 3Y, 3C, 3M, and 3K corresponding to the Y, C, M, and K colors respectively, the photosensitive drum 3K is treated as the standard. Further, the optical-writing start timing for the photosensitive drum 3K is treated as the standard and the optical-writing start timings for the other photosensitive drums 3Y, 3C, and 3M are corrected.

In the printer according to the present invention, a common single polygon mirror is used to slant the four laser beams to the photosensitive drums 3Y, 3C, 3M, and 3K and to carry out optical scanning in the main scanning direction with respect to the respective photosensitive drums 3Y, 3C, 3M, and 3K. Thus, in the printer according to the present invention, the timing correcting process is used to correct the optical-writing start timing for each photosensitive drum in a time period unit that is equivalent to writing of a single line (a single scanning line). For example, if the superposing misalignment, which exceeds by half a dot in the secondary scanning direction (photosensitive drum surface moving direction), occurs between two photosensitive drums, the optical-writing start timing for any one of the photosensitive drums is shifted forward or backward in an integral multiple of the time period that is equivalent to writing of the single line. To be further specific, if the superposing misalignment is ¾ of a dot, the optical-writing start timing is shifted forward or backward by the time period for writing the single line. If the superposing misalignment is ⅞ of a dot, the optical-writing start timing is shifted forward or backward by twice the time period for writing the single line. Due to this, the superposing misalignment amount in the secondary scanning direction can be curbed to less than or equal to half a dot.

However, when the superposing misalignment amount in the secondary scanning direction is half a dot, even if the optical-writing start timing is shifted forward or backward by the time period for writing the single line, the superposing misalignment amount does not change and remains half a dot. Further, when the superposing misalignment amount in the secondary scanning direction is less than half a dot, if the optical-writing start timing is shifted forward or backward by the time period for writing the single line, the superposing misalignment amount increases. Due to this, the optical-writing start timing is not corrected when the superposing misalignment amount is less than half a dot.

Thus, in the timing correcting process, if the superposing misalignment of less than or equal to half a dot occurs in the secondary scanning direction for the entire image, the superposing misalignment cannot be reduced by correcting the optical-writing start timing. The superposing misalignment of less than or equal to half a dot for the entire image does not occur due to a speed fluctuation of the photosensitive drum surface. The superposing misalignment of less than or equal to half a dot occurs due to shifting of the optical-writing start timing from a desired timing by a time period equivalent to less than or equal to half a dot. For example, when a resolution of the image is 600 dots per inch (dpi), because a single dot is approximately 42 μm, even if the timing correcting process is carried out, the entire image is displaced by approximately 21 μm at the most in the secondary scanning direction.

Figure 13:
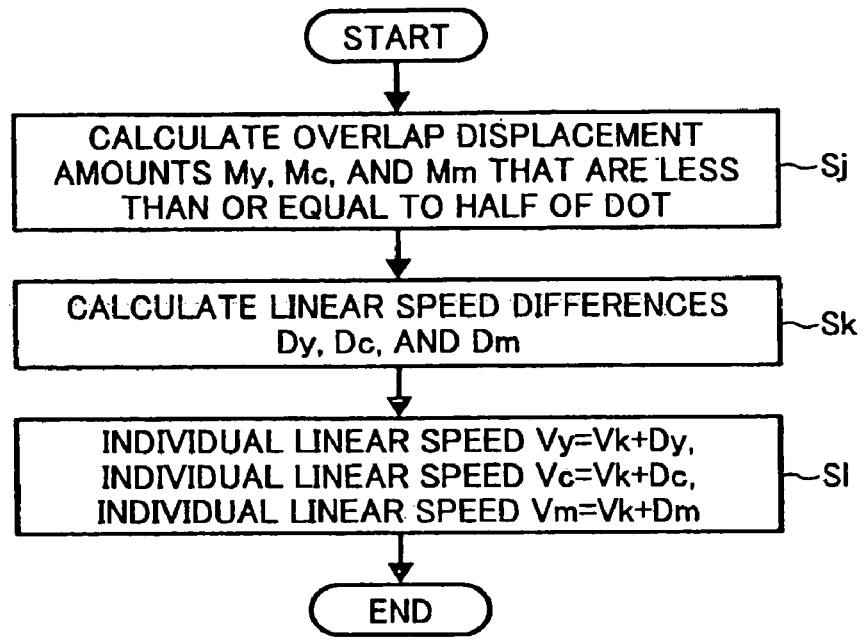
FIG. 13 is a flowchart of an individual linear-speed determining process that is executed by the controller.

Even the superposing misalignment of less than or equal to half a dot for the entire image needs to be curbed for enabling to meet the recent demand of high image quality. In the printer according to the present invention, after carrying out the timing correcting process shown in FIG. 12, an individual linear-speed determining process shown in FIG. 13 is further carried out. In the individual linear-speed determining process, superposing misalignment amounts My, Mc, and Mm, which indicate the respective superposing misalignment amounts of less than or equal to half a dot that remain even after correcting the optical-writing start timings, are calculated for the Y, C, and M colors with respect to K (Sj). Next, linear speed differences Dy, Dc, and Dm, which indicate the respective linear speed differences of the photosensitive drums 3Y, 3C, and 3M with respect to a standard linear speed Vk that can eliminate the superposing misalignment amounts My, Mc, and Mm, are calculated based on the superposing misalignment amounts My, Mc, Mm, and the standard linear speed Vk that is a speed of the photosensitive drum 3K (Sk). Next, individual linear speeds Vy, Vc, and Vm of the respective photosensitive drums 3Y, 3C, and 3M are calculated by adding the standard linear speed Vk and the linear speed differences Dy, Dc, and Dm respectively (Sl).

In an image forming process in which the image is formed based on the image data that is transmitted from the external personal computer, driving of the process driving motor 120K is controlled to ensure that the standard photosensitive drum 3K is rotated at the standard linear speed Vk. Similarly, driving of the process driving motors 120Y, 120C, and 120M is also controlled to ensure that the process driving motors 120Y, 120C, and 120M rotate at the individual linear speeds Vy, Vc, and Vm respectively. Due to this, in the image forming process, the linear speed differences Dy, Dc, and Dm occur between the photosensitive drum 3K and the photosensitive drums 3Y, 3C, and 3M respectively. Thus, the superposing misalignment, of the Y, C, and M toner images with respect to the K toner image, that is less than or equal to half a dot in the secondary scanning direction can be further curbed.

The not shown controller of the printer carries out at predetermined timings, a fluctuation-pattern detecting process for detecting a speed fluctuation pattern per single rotation for each photosensitive drum. The predetermined timings indicate timings when the photosensitive drums are substituted or when the photosensitive drums are attached to or removed from the printer, in other words, when carrying out operations that change the speed fluctuation patterns.

Figure 14:
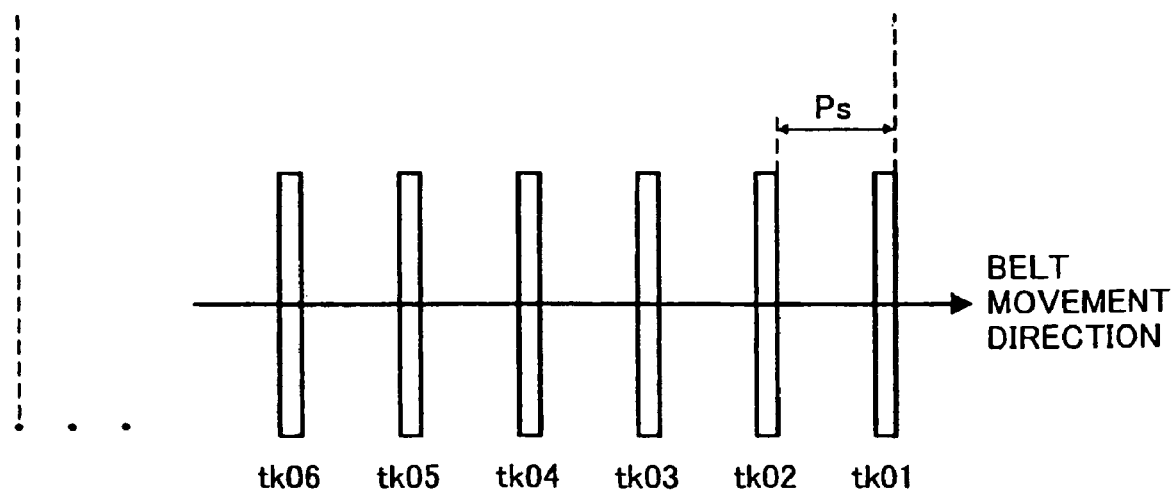
FIG. 14 is a schematic diagram of a K speed-fluctuation detecting image.

In the fluctuation-pattern detecting process, speed-fluctuation detecting images are formed on the surface of the intermediate transfer belt 41 for the Y, C, M, and K colors respectively. The speed-fluctuation detecting image for the color K is used as an example to explain the speed-fluctuation detecting images. As shown in FIG. 14, a plurality of K toner images tk01, tk02, tk03, tk04, tk05, tk06 and so on are arranged at a predetermined pitch (Ps) along the belt movement direction. Although the K toner images are logically arranged at the predetermined pitch, a speed fluctuation due to decentering of the photosensitive drum gear 133K of the photosensitive drum 3K causes occurrence of errors according to the speed fluctuation in an actual arrangement pitch of the K toner images. The first optical sensor 137 or the second optical sensor 138 read the errors as time period pitch errors.

In the printer according to the present invention, among the speed-fluctuation detecting images of the Y, C, and M colors, the speed-fluctuation detecting images of two colors are formed parallel to each other. To be specific, for example, the speed-fluctuation detecting image of Y color is formed at one end in the belt width direction of the intermediate transfer belt 41 and the speed-fluctuation detecting image of C color is formed at the other end of the intermediate transfer belt 41. The first optical sensor 137 detects the speed-fluctuation detecting image at one end of the intermediate transfer belt 41 and the second optical sensor 138 detects the speed-fluctuation detecting image at the other end. Thus, the arrangement mentioned earlier to detect the speed-fluctuation detecting images enables to reduce a detection time period of speed fluctuation patterns compared to an arrangement in which the speed-fluctuation detecting images of each color are sequentially formed on the intermediate transfer belt 41 and the speed-fluctuation detecting images are detected by any one of the optical sensors.

Figure 15:
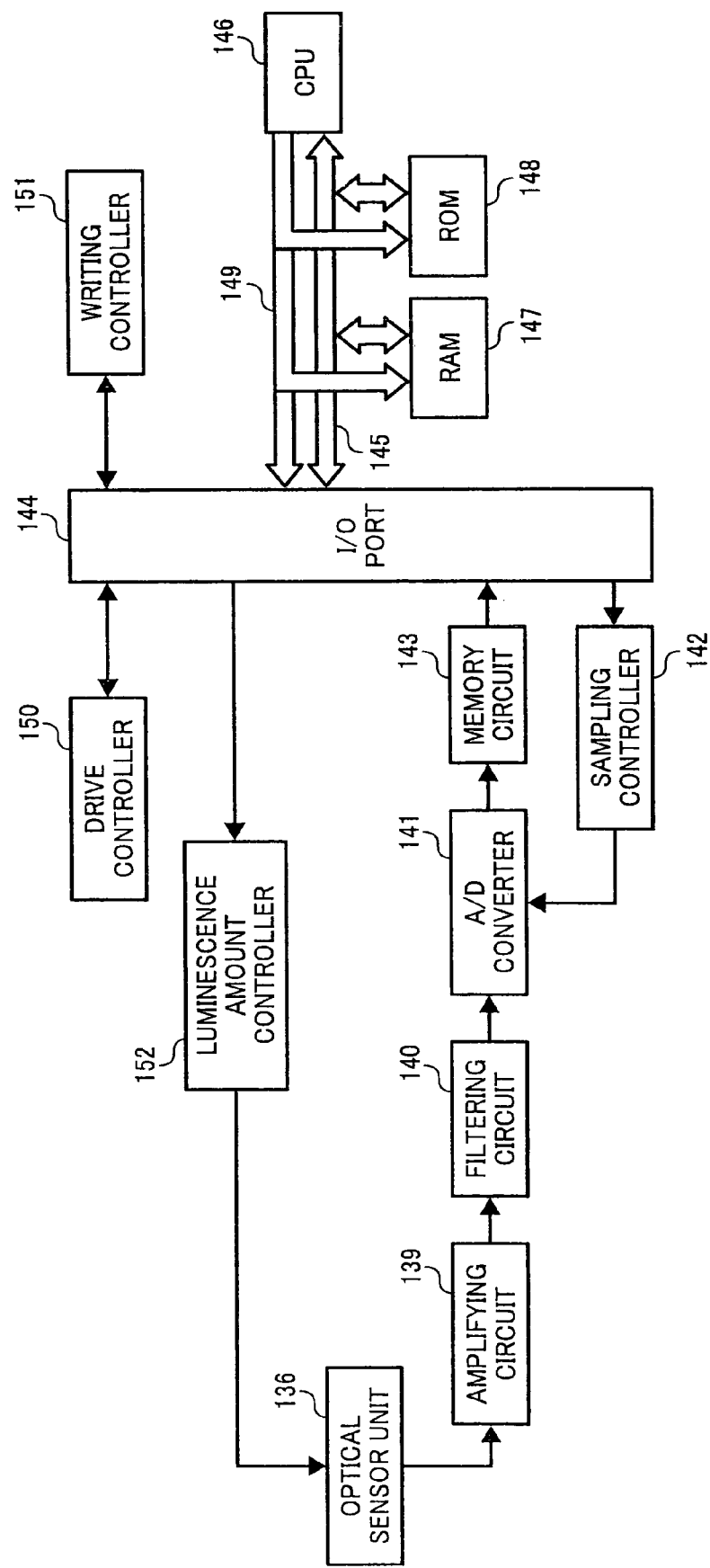
FIG. 15 is a block diagram of a circuit structure in the controller of the printer.

FIG. 15 is a block diagram of a circuit structure in the controller of the printer according to the present invention. Upon the controller starting the timing correcting process or the speed pattern detecting process, an amplifying circuit 139 amplifies output signals from the optical sensor 136. A filtering circuit 140 selects only a signal component of line detection from the amplified output signals. An analog to digital (A/D) converter 141 converts analog data of the signal component to digital data. A sampling controller 142 controls sampling of data and the sampled data is stored in a memory circuit 143 that uses a first-in-first-out (FIFO) method. Upon the controller completing a detection of the misalignment detecting image PV or the speed-fluctuation detecting images, the data stored in the memory circuit 143 is loaded by a data bus 145 into a central processing unit (CPU) 146 and a RAM 147 via an input output port 144. The CPU 146 carries out various calculating processes for calculating various displacement amounts. The various displacement amounts include a position displacement amount of the toner image of each color, a skew displacement amount, a phase displacement amount of the speed fluctuation pattern of each photosensitive drum etc. Further, the CPU 146 also carries out a calculating process of magnification amounts of the toner image of each color during a main scanning and a secondary scanning.

Based on the calculated displacement amounts, the CPU 146 causes a drive controller 150 and a writing controller 151 to store therein data for carrying out the skew correction of the toner image of each color, the position correction in the main scanning direction, the position correction in the secondary scanning direction, the magnification correction etc. The drive controller 150 is a circuit that controls the process driving motors 120Y, 120C, 120M, and 120K that drive the respective photosensitive drums 3Y, 3C, 3M, and 3K. The writing controller 151 is a circuit that controls the optical writing unit 20.

Based on the data that is transmitted from the CPU 146, the writing controller 151 regulates a writing start position in the main scanning direction and in the secondary scanning direction for each photosensitive drum. Further, the writing controller 151 includes for each color, a device that enables to minutely set an output frequency, for example, a clock generating unit that uses a voltage controlled oscillator (VCO). In the printer according to the present invention, an output of the clock generating unit is used as an image clock.

Based on the data that is transmitted from the CPU 146, the drive controller 150 constructs drive control data for each process driving motor for enabling to appropriately regulate a phase of the speed fluctuation per single rotation of each photosensitive drum.

In the printer according to the present invention, for enabling the optical sensor 136 to reliably grasp the toner image inside a detecting image regardless of a deterioration of the emitter of the optical sensor 136, a luminescence amount controller 152 controls a luminescence amount of the emitter. Due to this, the received light amount from the emitter of the optical sensor 136 always remains fixed.

A read only memory (ROM) 148, which is connected to the data bus 145, stores therein an algorithm for calculating the various displacement amounts, a control program for carrying out a printing job, a computer program for executing the timing correcting process and the fluctuation-pattern detecting process. Further, the ROM 148 also stores therein a computer program for carrying out phase regulation control that is explained later. The CPU 146 specifies a ROM address, a RAM address, and various types of input output devices via an address bus 149.

The time period pitch errors, which are reflected in the data that is stored in the RAM 147, correspond to the speed fluctuation patterns per single rotation of the photosensitive drums 3Y, 3C, 3M, and 3K. During a single rotation of the photosensitive drums 3Y, 3C, 3M, and 3K, time points of occurrence of the minimum speed and the maximum speed correspond respectively to time points of an upper limit and a lower limit of a sine curve of speed fluctuation attributes that occur due to decentering of the photosensitive drum gears 133Y, 133C, 133M, and 133K. A pattern of the sine curve is analyzed as the speed fluctuation pattern by establishing a correspondence between the markings 134Y, 134C, 134M, and 134K and the timings that are detected by the position sensors 135Y, 135C, 135M, and 135K.

In the printer according to the present invention, the superposing misalignment of less than half a dot for the entire image is reduced by imparting a linear speed difference to each photosensitive drum. However, when executing the timing correcting process and the fluctuation-pattern detecting process, the photosensitive drums 3Y, 3C, 3M, and 3K are rotated at the standard linear speed Vk that is a first linear speed without imparting the linear speed difference to each photosensitive drum. Further, each process driving motor is driven at a constant speed without carrying out a fine tuning of a driving speed by using a driving speed fine tuning pattern that is explained later.

Because the speed fluctuation patterns during a single rotation of the photosensitive drums 3Y, 3C, 3M, and 3K are not affected by a change in the internal temperature of the printer or an external force, the fluctuation-pattern detecting process need not be carried out frequently. However, if the processors 1Y, 1C, 1M, and 1K are attached to or removed from the printer, the speed fluctuation patterns of the processors 1Y, 1C, 1M, and 1K with respect to the photosensitive drums 3Y, 3C, 3M, and 3K change significantly. Due to this, in the printer according to the present invention, the fluctuation-pattern detecting process is carried out when any one of the processors 1Y, 1C, 1M, and 1K is attached to or removed from the printer. A not shown removal and attachment detector detects a removal or attachment of the processors 1Y, 1C, 1M, and 1K.

In a method used as an example of the removal and attachment detector, based on whether output signals from four unit detecting sensors, which individually detect the respective processors 1Y, 1C, 1M, and 1K, are tuned on after being turned off, a removal or an attachment of the processors 1Y, 1C, 1M, and 1K can be detected. In another method, an electronic circuit board, which includes a mounted integrated circuit (IC) that stores therein a unit identification (ID) number, is arranged on each processor. The electronic circuit board and the controller are connected via a touch contact point and a substitution of the processors 1Y, 1C, 1M, and 1K can be detected based on a change in the unit ID number.

In the printer according to the present invention, upon detecting a removal or an attachment of the processors 1Y, 1C, 1M, and 1K, the fluctuation-pattern detecting process is always carried out in combination with the timing correcting process. To be specific, upon detecting a removal or an attachment of the processors 1Y, 1C, 1M, and 1K, the fluctuation-pattern detecting process is carried out after the timing correcting process is carried out. A printing job (image forming process) is not accepted during such a string (hereinafter, "routine after unit removal and attachment detection") of a control flow mentioned earlier.

Figure 16:
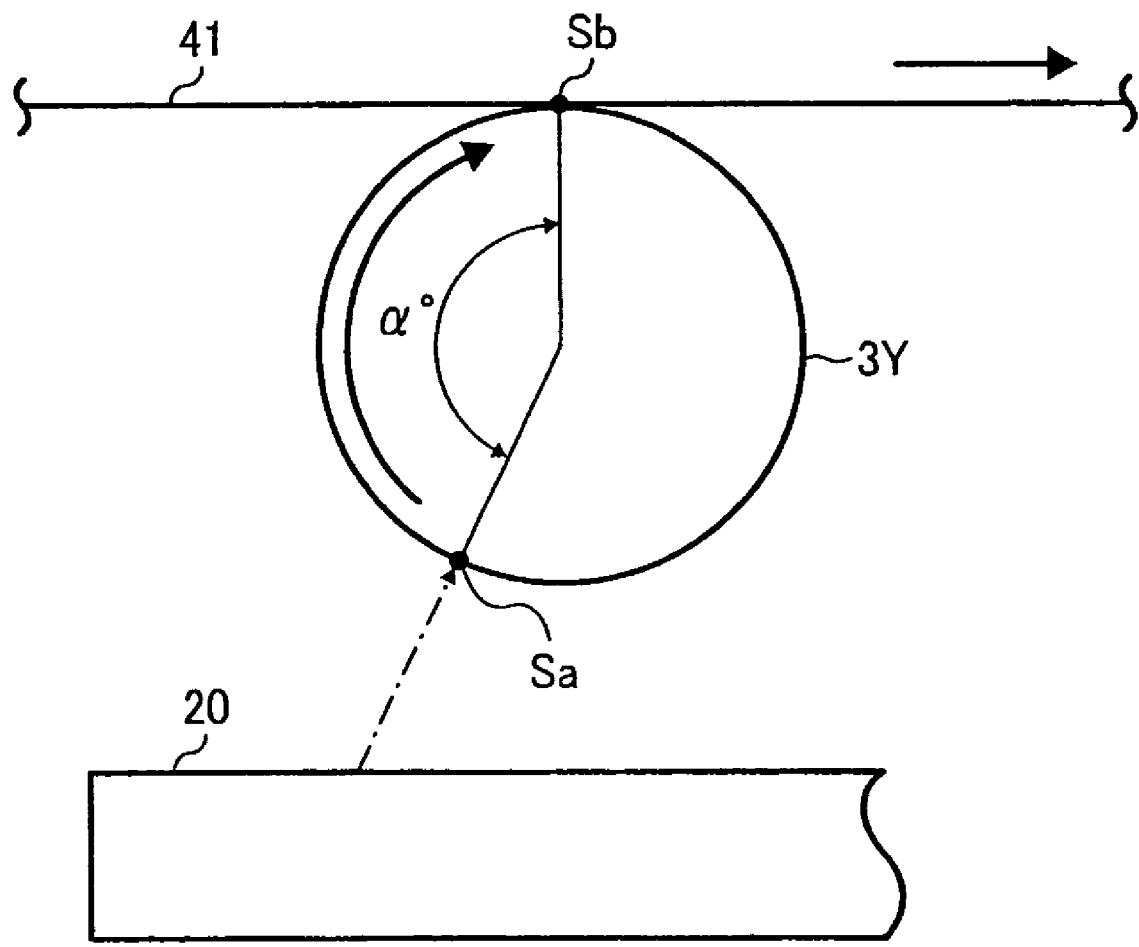
FIG. 16 is a schematic for explaining a relation between a latent image writing position and a transfer position.

A graph which indicates the time period pitch errors over a time period differs from the actual speed fluctuation pattern of the photosensitive drums 3Y, 3C, 3M, and 3K. The graph mentioned earlier is explained in detail later. As shown in FIG. 16, the Y electrostatic latent image is formed on the photosensitive drum 3Y due to emission of a writing light from the optical writing unit 20. As shown in FIG. 16, a latent image writing position, on a rotary path of the photosensitive drum 3Y, due to the writing light from the optical writing unit 20 is indicated by a reference symbol Sa. Further, a transfer position of the Y toner image on the intermediate transfer belt 41 is indicated by a reference symbol Sb.

Figure 17:
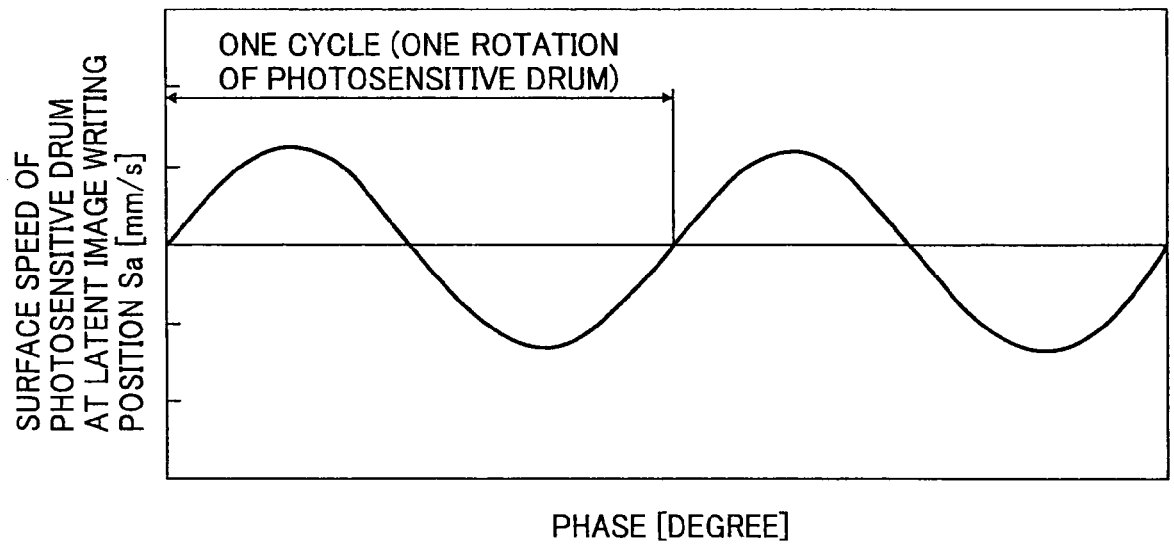
FIG. 17 is a graph of a speed fluctuation attribute of a photosensitive drum surface at the latent image writing position.
Figure 18:
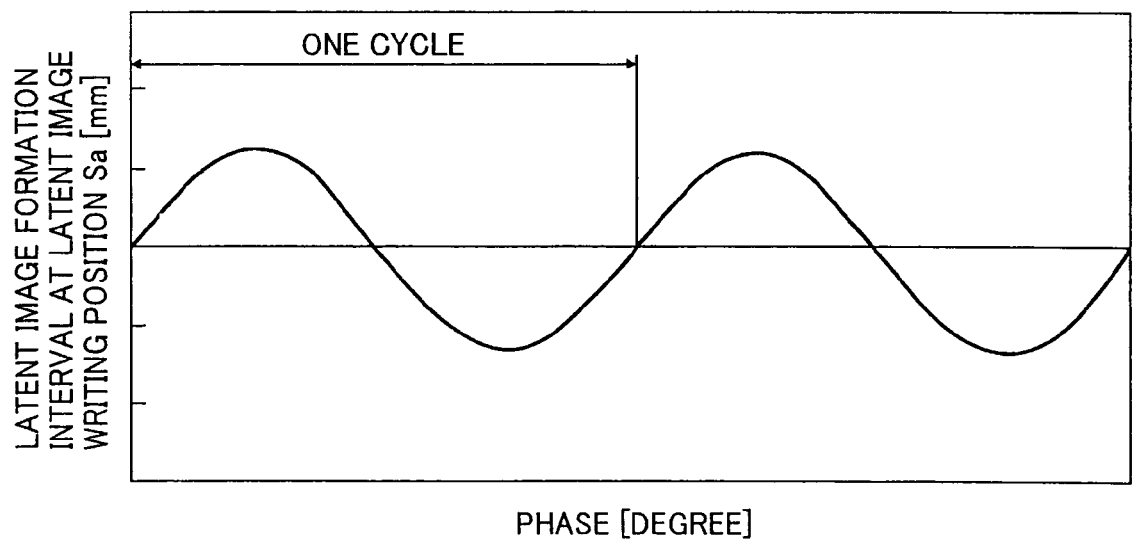
FIG. 18 is a graph of a latent image formation interval fluctuation attribute at the latent image writing position.

Because each Y toner image inside the Y speed-fluctuation detecting image needs to be formed at an equal interval in a circumferential direction with respect to the photosensitive drum 3Y, the writing light, for forming each Y latent image that is a precursor of each Y toner image, is emitted at the respective equal time intervals. However, if the speed fluctuation, in the form of sine curve shaped attributes, occurs per single rotation of the photosensitive drum 3Y due to decentering of the photosensitive drum gear 133Y, formation intervals of the Y latent images fluctuate according to the speed fluctuation. To be specific, if the photosensitive drum 3Y is surface moving at a faster speed than the standard linear speed Vk due to decentering of the photosensitive drum gear 133Y, the formation intervals of the Y toner images at the latent image writing position Sa become greater than the original formation intervals. If the photosensitive drum 3Y is surface moving at a slower speed than the standard linear speed Vk, the formation intervals of the Y toner images become smaller than the original formation intervals. Thus, if the surface of the photosensitive drum 3Y is subjected to the speed fluctuation that includes an attribute shown in FIG. 17, the formation intervals of the Y toner images at the latent image writing position Sa fluctuate due to an attribute shown in FIG. 18. Phases of the attributes shown in FIGS. 17 and 18 match completely.

Figure 19:
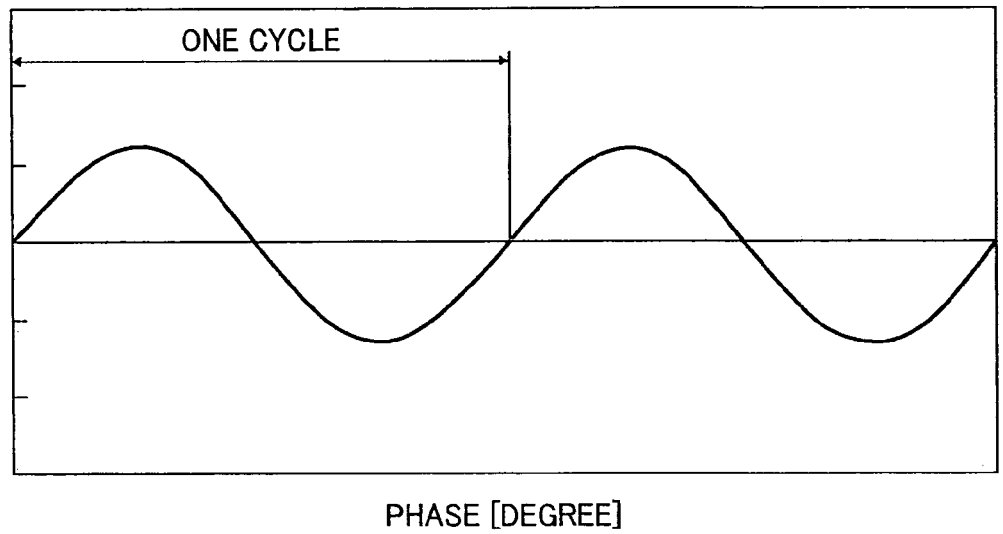
FIG. 19 is a graph of the speed fluctuation attribute of the photosensitive drum surface at the transfer position.
Figure 20:
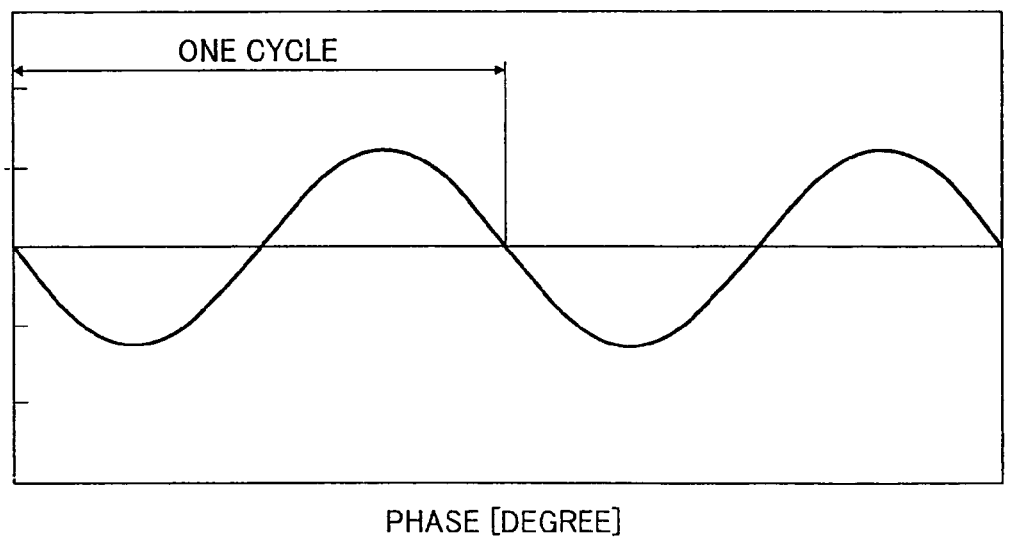
FIG. 20 is a graph of the latent image formation interval fluctuation attribute at the transfer position.

If the speed fluctuation occurs in the photosensitive drum 3Y due to decentering of the photosensitive drum gear 133Y when the Y toner images obtained by developing the Y latent images are primary transferred to the intermediate transfer belt 41, even if the multiple Y toner images are arranged at equal intervals on the photosensitive drum 3Y, the Y toner images are transferred to the intermediate transfer belt 41 at unequal intervals. Thus, if the photosensitive drum 3Y is surface moving at a faster speed than the standard linear speed Vk at the transfer position Sb, the formation intervals of the Y toner images on the intermediate transfer belt 41 become smaller than the original intervals. If the photosensitive drum 3Y is surface moving at a slower speed than the standard linear speed Vk at the transfer position Sb, the formation intervals of the Y toner images on the intermediate transfer belt 41 become greater than the original intervals. Due to this, if the surface of the photosensitive drum 3Y is causing the speed fluctuation at the transfer position Sb due to the attribute that is shown in FIG. 19, the formation intervals of the toner images on the intermediate transfer belt 41 fluctuate due to the attribute that is shown in FIG. 20. Phases of the attributes shown in FIGS. 19 and 20 are completely inverted.

Figure 21:
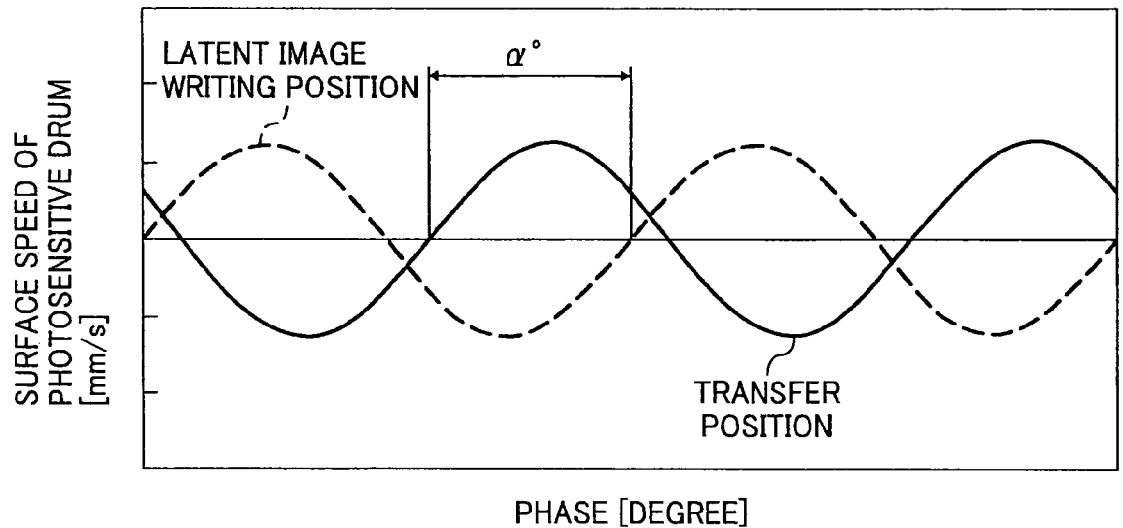
FIG. 21 is a graph of a relation between the speed fluctuation attribute of the photosensitive drum surface at the latent image writing position and the speed fluctuation attribute of the photosensitive drum surface at the transfer position.
Figure 22:
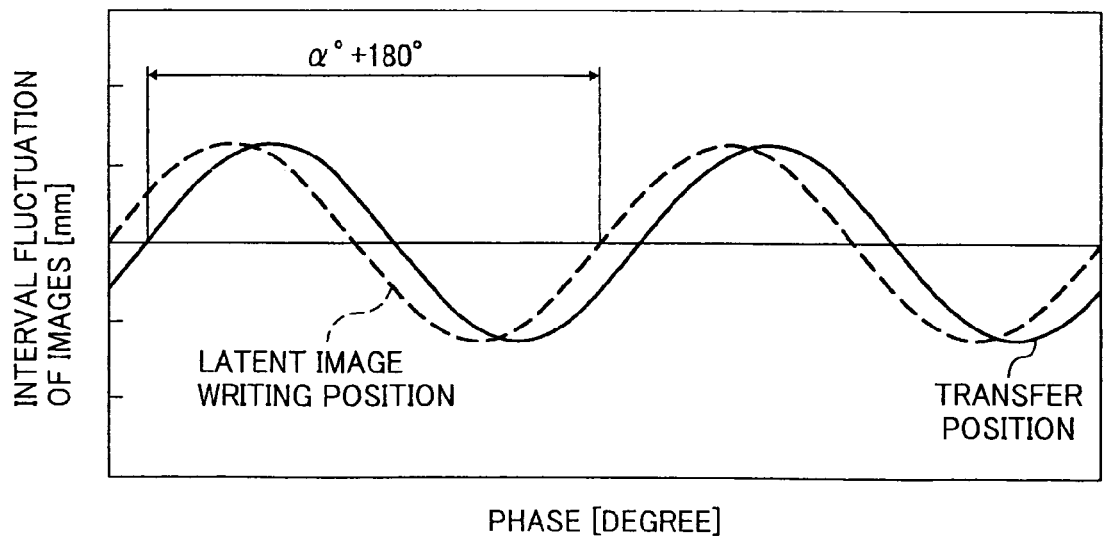
FIG. 22 is a graph of a relation between the latent image formation interval fluctuation attribute at the latent image writing position and the latent image formation interval fluctuation attribute at the transfer position.

Thus, the formation intervals of the Y toner images inside the Y speed-fluctuation detecting image on the intermediate transfer belt 41 are formed as a result of superimposition of the fluctuation due to a photosensitive drum surface speed fluctuation at the latent image writing position Sa and the fluctuation due to a photosensitive drum surface speed fluctuation at the transfer position Sb. For example, as shown in FIG. 16, it is assumed that an angle between the latent image writing position Sa and the transfer position Sb is $\alpha°$. As shown in FIG. 21, the phase of the attribute of the photosensitive drum surface speed fluctuation at the latent image writing position Sa and the phase of the attribute of the photosensitive drum surface speed fluctuation at the transfer position Sb are displaced with respect to each other by $\alpha°$. However, a pitch relation of the linear speed and a magnitude relation of an image interval of the photosensitive drum 3Y are inverted at the time of latent image writing and image transfer. Thus, as shown in FIG. 22, upon noting the formation intervals of the toner images on the intermediate transfer belt 41, it can be inferred that the two attributes are displaced by $\alpha+180°$ with respect to each other.

Figure 23:
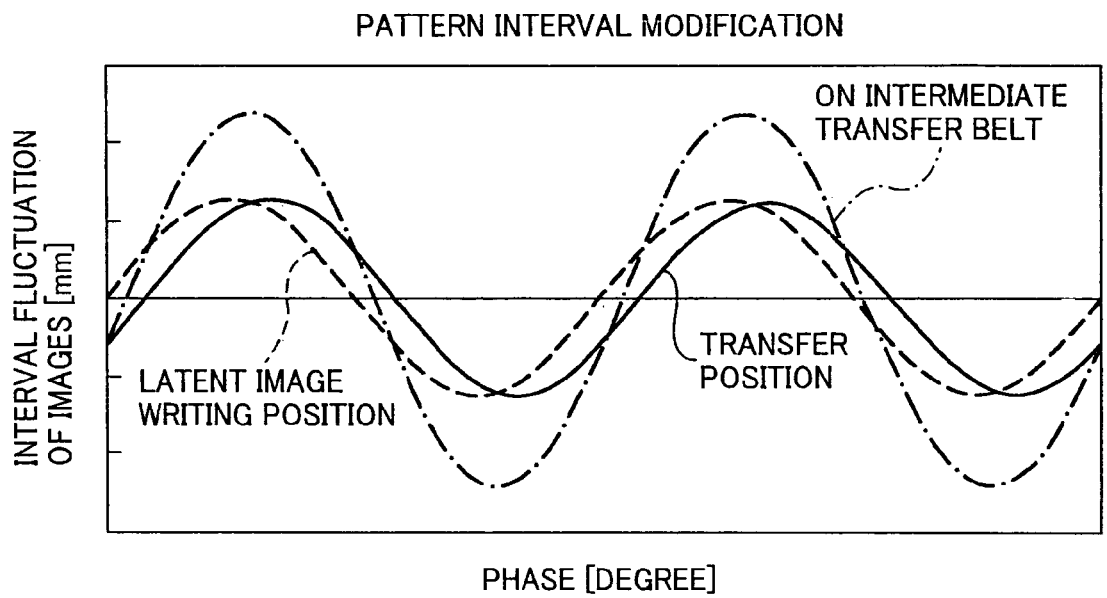
FIG. 23 is a graph of a relation between a fluctuation attribute that is detected based on detection time period pitch errors and the speed fluctuation attribute of the photosensitive drum surface at the latent image writing position.
Figure 24:
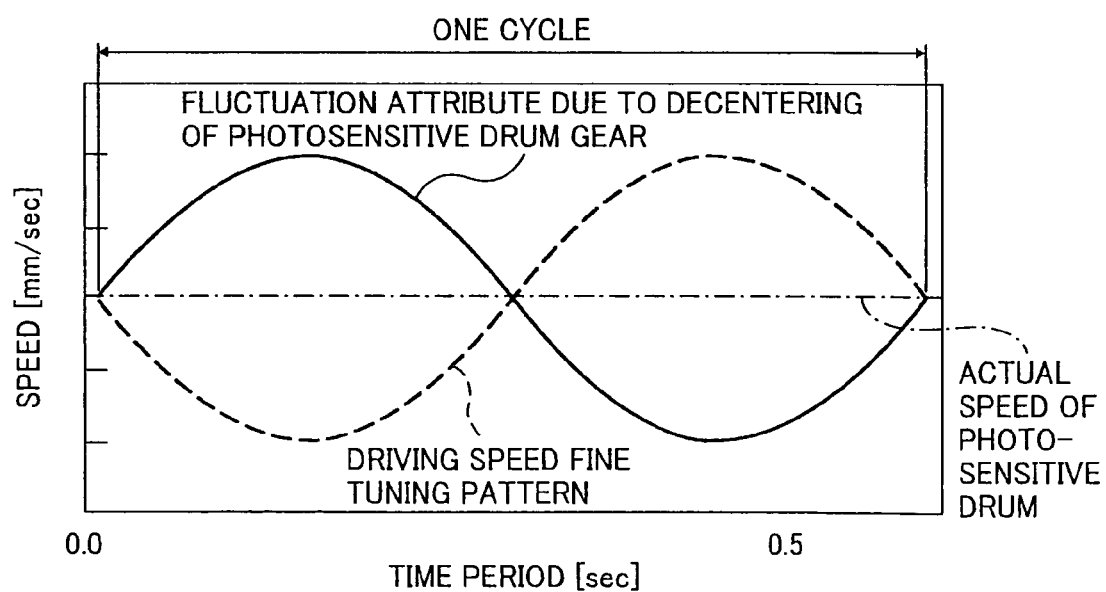
FIG. 24 is a graph of a relation between a speed fluctuation of the photosensitive drum surface at the latent image writing position and a driving speed fine tuning pattern.

Due to this, as shown in FIG. 23, the graph, which indicates the time period pitch errors of each toner image in the speed-fluctuation detecting image over a time period, includes a superimposition of an interval fluctuation attribute of the latent images that occurs at the latent image writing position Sa and an interval fluctuation attribute of the toner images that occurs at the transfer position Sb (includes a synthesized wave of the two attribute waves). Using a commonly known analyzing method enables to analyze a latent image formation interval fluctuation attribute (the actual speed fluctuation pattern of the photosensitive drum 3Y) at the latent image writing position Sa from a relation between a phase and an amplitude of the synthesized wave and $\alpha+180°$ that is explained earlier. As shown in FIG. 24, if the process driving motors 120Y, 120C, 120M, and 120K are driven using the driving speed fine tuning pattern that is in an antiphase relation (with the same amplitude) to the latent image formation interval fluctuation attribute (speed fluctuation pattern), the speed fluctuation of the photosensitive drums 3Y, 3C, 3M, and 3K is negated by the speed fluctuation of the driving speed and an actual surface movement speed of the photosensitive drums 3Y, 3C, 3M, and 3K can be stabilized by a center value of the sine curve. In other words, the speed fluctuation of the photosensitive drums 3Y, 3C, 3M, and 3K can be nearly eliminated.

However, before analyzing the driving speed fine tuning pattern, a rotary position (a rotary angle) of the photosensitive drums 3Y, 3C, 3M, and 3K or the photosensitive drum gears 133Y, 133C, 133M, and 133K at a starting point (the optical-writing start timing of the latent images corresponding to a tip of the speed-fluctuation detecting image) of the waveform of the latent image formation interval fluctuation attribute needs to be grasped. Based on a timing (hereinafter, "gear predetermined angle timing") when the position sensors 135Y, 135C, 135M, and 135K detect the markings 134Y, 134C, 134M, and 134K of the photosensitive drum gears 133Y, 133C, 133M, and 133K of the corresponding colors, the controller of the printer according to the present invention determines the optical-writing start timing of the speed-fluctuation detecting image of the respective colors.

A method of determining the optical-writing start timing is explained in detail. The controller starts forming the latent images of the speed-fluctuation detecting image of each color at a timing (a latent image formation start timing) that is displaced from the gear predetermined angle start timing by a predetermined time period t1. The latent image formation start timing is a time point when the predetermined time period t1 is added to the gear predetermined angle start timing. In other words, a time point after lapse of the predetermined time period t1, from the instant when the position sensors 135Y, 135C, 135M, and 135K have detected the markings 134Y, 134C, 134M, and 134K of the photosensitive drum gears 133Y, 133C, 133M, and 133K, is the starting point of the waveform (the actual speed fluctuation pattern of the photosensitive drum gears 133Y, 133C, 133M, and 133K) of the latent image formation interval fluctuation attribute at the latent image writing position Sa. By treating the starting point as a standard, if the process driving motors 120Y, 120C, 120M, and 120K are driven using the driving speed fine tuning pattern that is in antiphase relation to the waveform of the latent image formation interval fluctuation attribute at the latent image writing position Sa, the speed fluctuation of the photosensitive drums 3Y, 3C, 3M, and 3K due to decentering of driven gears in the form of the photosensitive drum gears 133Y, 133C, 133M, and 133K can be negated by the speed fluctuation of the driving speed. Thus, the speed fluctuation of the photosensitive drums 3Y, 3C, 3M, and 3K can be nearly eliminated.

In the printer according to the present invention, when carrying out the image forming process to form the image based on the image data that is transmitted from the personal computer etc., a driving speed fine tuning is carried out to drive the process driving motors 120Y, 120C, 120M, and 120K. In other words, based on the prior analyzed driving speed fine tuning pattern, the timing of detection of the markings 134Y, 134C, 134M, and 134K by the position sensors 135Y, 135C, 135M, and 135K, and the predetermined time period t1, the driving speed of the process driving motors 120Y, 120C, 120M, and 120K of the respective colors is fine tuned.

Figure 25:
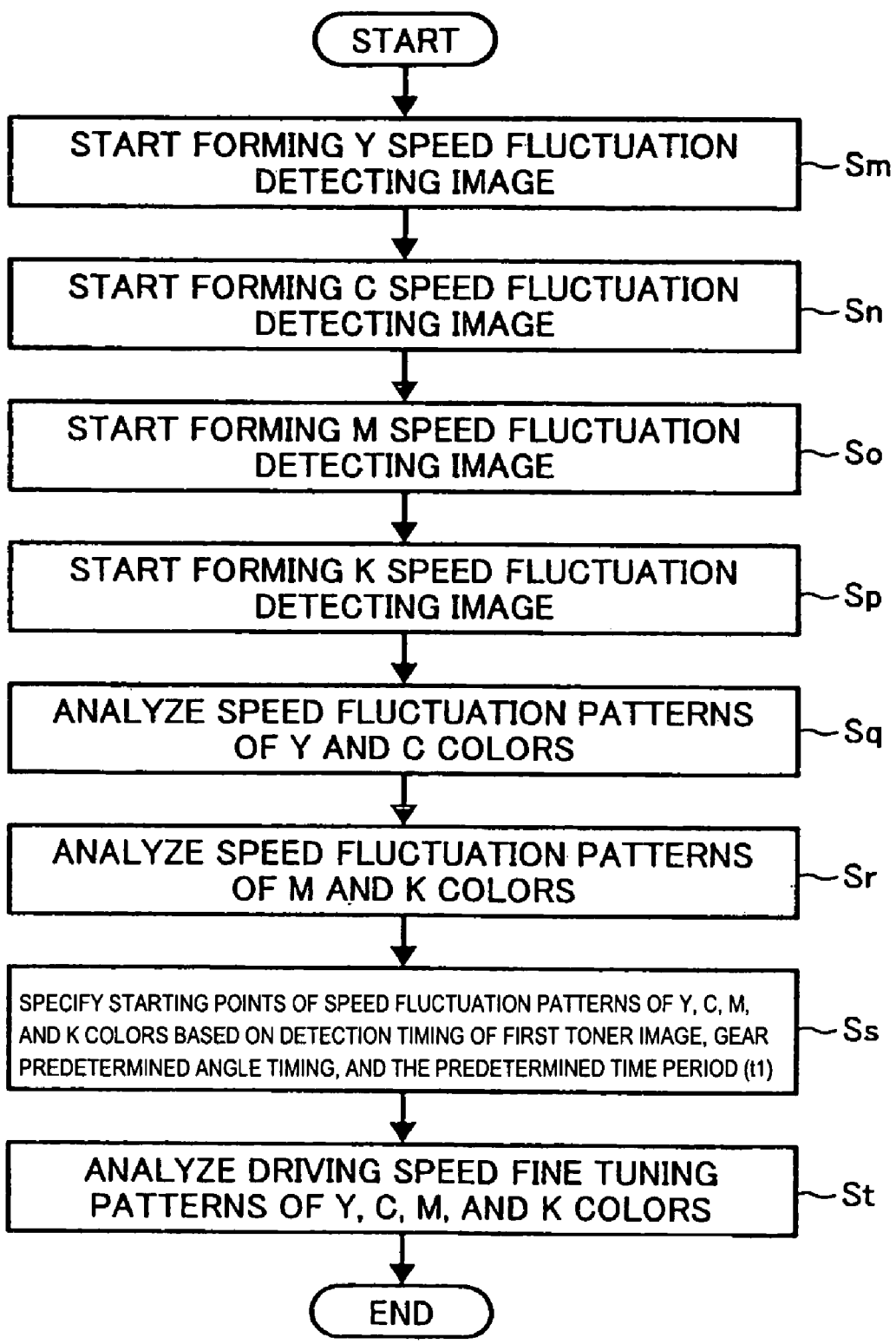
FIG. 25 is a flowchart of a fluctuation-pattern detecting process and a fine-tuning-pattern determining process that are executed by the printer.

FIG. 25 is a flowchart of the fluctuation-pattern detecting process and a fine-tuning-pattern determining process in the printer according to the present invention. First, the controller sequentially starts formation of the speed-fluctuation detecting images of the Y, C, M, and K colors (Sm, Sn, So, and Sp). After sequentially transferring the speed-fluctuation detecting images onto the intermediate transfer belt 41, the controller causes the optical sensor 136 to detect the speed-fluctuation detecting images. The optical sensor 136 simultaneously detects the speed-fluctuation detecting images for the Y and C colors and analyzes the speed fluctuation patterns of the Y and C colors (Sq). Similarly, the optical sensor 136 simultaneously detects the speed-fluctuation detecting images for the M and K colors and analyzes the speed fluctuation patterns of the M and K colors (Sr). Next, based on a detection timing of a first toner image in the Y, C, M, and K speed-fluctuation detecting images, the gear predetermined angle timing of the Y, C, M, and K colors, and the predetermined time period t1, the controller specifies the starting points of the Y, C, M, and K speed fluctuation patterns (Ss). Next, based on the Y, C, M, and K speed fluctuation patterns and the respective starting points, the controller analyzes the driving speed fine tuning patterns of the Y, C, M, and K colors (St).

A structure, which indicates a salient feature of the printer according to the present invention, is explained next.

First, "standard linear speed" is clearly defined for a better understanding. In the printer according to the present invention, when forming the speed-fluctuation detecting image of each color, the photosensitive drums 3Y, 3C, 3M, and 3K of the respective colors are rotated at the standard linear speed Vk. When rotating the photosensitive drums 3Y, 3C, 3M, and 3K at the standard linear speed Vk, the process driving motors 120Y, 120C, 120M, and 120K of the respective colors are driven at a constant speed without carrying out the driving speed fine tuning. Due to this, a surface speed of the photosensitive drums 3Y, 3C, 3M, and 3K fluctuates by an attribute that is indicated by a continuous line shown in FIG. 24 and that resembles the sine curve equivalent to one cycle per single rotation. If the surface speed of the photosensitive drums 3Y, 3C, 3M, and 3K fluctuates by the sine curve shaped speed fluctuation attribute shown in FIG. 24, the standard linear speed Vk in the present invention indicates an average speed per single rotation of the photosensitive drums 3Y, 3C, 3M, and 3K and is a center value of the sine curve.

In the image forming process to form the image based on the image data transmitted from the personal computer, the driving speed of the process driving motors 120Y, 120C, 120M, and 120K is fine tuned based on the respective driving speed fine tuning pattern. Due to this, the surface of each photosensitive drum rotates at a stable linear speed. To ensure that the linear speed is of the same value as the center value of the sine curve indicating the standard speed Vk at the time of formation of the respective speed-fluctuation detecting images, the fine tuning pattern, which is determined (analyzed) by the fine-tuning-pattern determining process indicated at steps Ss and St of FIG. 25, can also be used.

However, in the image forming process which is carried out by the printer according to the present invention, for curbing the superposing misalignment of less than or equal to half a dot that cannot be reduced by correcting the optical-writing start timing, the marginal linear speed differences (Dy, Dc, and Dm) are imparted between the respective photosensitive drums 3Y, 3C, 3M, and the photosensitive drum 3K. Due to this, the photosensitive drums 3Y, 3C, and 3M are rotated with the unique individual linear speeds Vy, Vc, and Vm respectively that marginally differ from the standard linear speed Vk of the photosensitive drum 3K. Even a marginal difference between the linear speeds causes respective rotation cycles of the photosensitive drums 3Y, 3C, and 3M to differ from a rotation cycle of the photosensitive drum 3K. Due to this, the speed fluctuation patterns of the photosensitive drums 3Y, 3C, 3M, which rotate with the respective individual linear speeds Vy, Vc, Vm during the image forming process, and the driving speed fine tuning patterns that appropriately correspond to the speed fluctuation patterns differ from the respective speed fluctuation patterns that are obtained during the fluctuation-pattern detecting process and the respective fine tuning patterns that are obtained during the fine-tuning-pattern determining process that are explained with reference to FIG. 25.

A change in the internal temperature of the printer or application of the external force causes a fluctuation in the optical path of the laser beam that is used for optical writing, thus resulting in a displacement of the Y, C, and M toner images with respect to the standard K toner image in the secondary scanning direction. Due to this, the timing correcting process, which corrects the optical-writing start timings to reduce the displacement, needs to be carried out at regular intervals such as after each lapse of a predetermined time period. After correcting the optical-writing start timings, because a change occurs in the displacement amounts that are less than or equal to half a dot of the Y, C, and M toner images and that remain even in the corrected optical-writing start timings, settings of the linear speed differences Dy, Dc, and Dm also need to be corrected according to the corrected optical-writing start timings. Moreover, upon correcting the settings of the linear speed differences Dy, Dc, and Dm, the speed fluctuation patterns of the photosensitive drums 3Y, 3C, and 3M and the respective driving speed fine tuning patterns that appropriately correspond to the speed fluctuation patterns also change. In other words, although the timing correcting process explained with reference to FIG. 12 needs to be periodically executed, carrying out the timing correcting process also inevitably necessitates simultaneous execution of the individual linear-speed determining process shown in FIG. 13 and the fine-tuning-pattern determining process shown in FIG. 25.

However, for carrying out the fine-tuning-pattern determining process, if the fluctuation-pattern detecting process is carried out at the time of carrying out the timing correcting process, formation and detection of the speed-fluctuation detecting images significantly increases the waiting time period of the user.

To overcome the drawback, the controller of the printer according to the present invention corrects the driving speed fine tuning patterns, determined by the fine-tuning-pattern determining process shown in FIG. 25, of the process driving motors 120Y, 120C, and 120M of the respective photosensitive drums 3Y, 3C, and 3M that rotate with the respective individual linear speeds Vy, Vc, and Vm during the image forming process. The controller uses the corrected driving speed fine tuning patterns in the image forming process.

Figure 26:
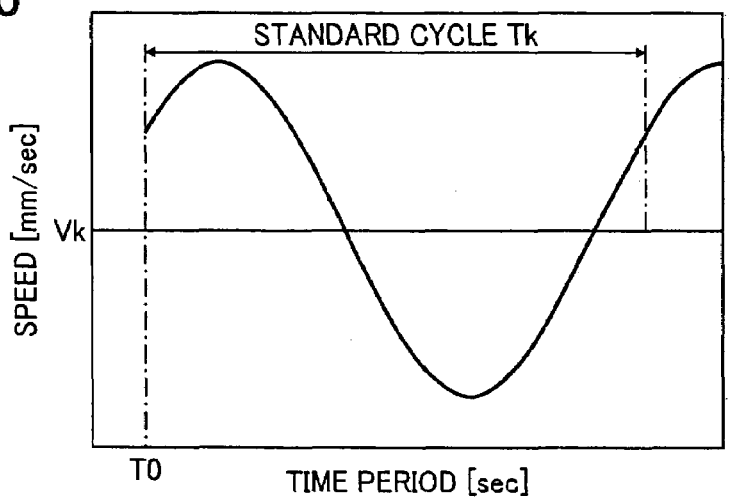
FIG. 26 is a graph of an example of the driving speed fine tuning pattern that is obtained by a fluctuation pattern detection control and the fine tuning pattern detecting process.

FIG. 26 is a graph of an example of the driving speed fine tuning pattern that is obtained by a fluctuation pattern detection control and the subsequent fine tuning pattern detecting process. The fluctuation pattern detection control is exercised under conditions that the surfaces of the photosensitive drums 3Y, 3C, 3M, and 3K include the sine curve shaped fluctuation attributes and are rotating at an average linear speed indicated by the standard linear speed Vk. As shown in FIG. 26, T0 indicates the optical-writing start timing of the speed-fluctuation detecting images. The optical-writing start timing can be specified based on the gear predetermined angle timing mentioned earlier. As shown in FIG. 26, a cycle of the driving speed fine tuning pattern is a standard cycle Tk corresponding to the standard linear speed Vk of the photosensitive drums 3Y, 3C, and 3M at the time of formation of the speed-fluctuation detecting images. If the photosensitive drums 3Y, 3C, and 3M are rotated at the respective individual linear speeds Vy, Vc, and Vm that differ from the standard linear speed Vk, the cycles of the speed fluctuation patterns per single rotation of the photosensitive drums 3Y, 3C, and 3M change to values corresponding to the respective individual linear speeds Vy, Vc, and Vm. Due to this, the cycles of the driving speed fine tuning patterns corresponding to the respective linear speeds Vy, Vc, and Vm differ from the standard cycle Tk that is shown in FIG. 26. However, regardless of the differing cycles, because a decentering amount of the photosensitive drum gears 133Y, 133C, and 133M is fixed, for the standard linear speed Vk and the individual linear speeds Vy, Vc, and Vm, amplitudes of the respective speed fluctuation patterns correspond to the decentering amount and become equal to each other. Thus, the speed fluctuation pattern corresponding to the standard linear speed Vk and the speed fluctuation patterns corresponding to the respective individual linear speeds Vy, Vc, and Vm only differ in the respective cycles. Similarly, the driving speed fine tuning pattern corresponding to the standard linear speed Vk and the driving speed patterns corresponding to the respective individual linear speeds Vy, Vc, and Vm only differ in the respective cycles. Due to this, based on the amplitude of the speed fluctuation pattern corresponding to the standard linear speed Vk, the standard cycle Tk, and a cycle T' corresponding to the individual linear speeds Vy, Vc, and Vm, the driving speed fine tuning patterns corresponding to the respective individual linear speeds Vy, Vc, and Vm can be analyzed.

Figure 27:
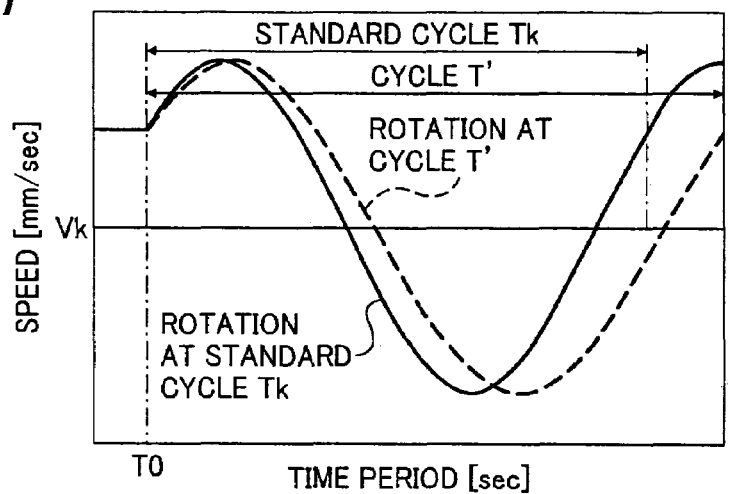
FIG. 27 is a graph of an example of the driving speed fine tuning pattern when individual nonstandard linear speeds Vy, Vc, and Vm are slower than a standard linear speed Vk.

FIG. 27 is a graph of an example of the driving speed fine tuning patterns when the individual linear speeds Vy, Vc, and Vm, which are non standard linear speeds, are slower than the standard linear speed Vk. If the individual linear speeds Vy, Vc, and Vm are slower than the standard linear speed Vk, the cycle T' of the driving speed fine tuning patterns (a graph of dotted lines shown in FIG. 27) corresponding to the individual linear speeds Vy, Vc, and Vm becomes longer than the standard cycle Tk corresponding to the standard linear speed Vk. Due to this, as shown in FIG. 27, the driving speed fine tuning patterns corresponding to the individual linear speeds Vy, Vc, and Vm are subjected to an expansion process with respect to the waveform of the driving speed fine tuning pattern corresponding to the standard linear speed Vk such that a length of the driving speed fine tuning patterns expands by a ratio "the standard cycle Tk/the cycle T'" in a direction of a time period axis while the amplitude remains the same. In a fine-tuning-pattern correcting process carried out by the printer according to the present invention, if a ratio of the standard cycle Tk/the cycle T' is greater than 1, the printer uses a known analyzing method to carry out the expansion process mentioned earlier, thereby correcting the driving speed fine tuning pattern corresponding to the standard linear speed Vk to the driving speed fine tuning patterns corresponding to the respective individual linear speeds Vy, Vc, and Vm. The correction mentioned earlier is carried out for the photosensitive drums 3Y, 3C, and 3M that are rotated at the individual linear speeds Vy, Vc, and Vm.

Figure 28:
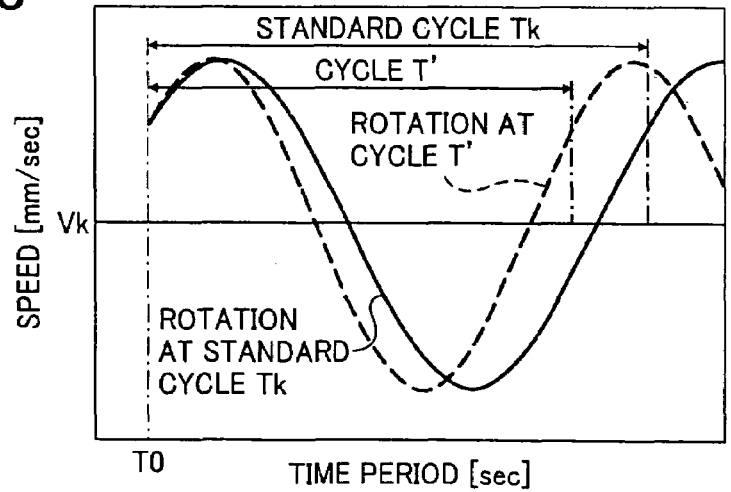
FIG. 28 is a graph of an example of the driving speed fine tuning pattern when the individual linear speeds Vy, Vc, and Vm are faster than the standard linear speed Vk.

FIG. 28 is a graph of an example of the driving speed fine tuning patterns when the individual linear speeds Vy, Vc, and Vm are faster than the standard linear speed Vk. If the individual linear speeds Vy, Vc, and Vm are faster than the standard linear speed Vk, the cycle T' of the driving speed fine tuning patterns (a graph of dotted lines shown in FIG. 28) corresponding to the individual linear speeds Vy, Vc, and Vm becomes shorter than the standard cycle Tk of the driving speed fine tuning pattern (a graph of a continuous line shown in FIG. 28) corresponding to the standard linear speed Vk. Due to this, as shown in FIG. 28, the driving speed fine tuning patterns corresponding to the individual linear speeds Vy, Vc, and Vm are subjected to a contraction process with respect to the waveform of the driving speed fine tuning pattern corresponding to the standard linear speed Vk such that a length of the driving speed fine tuning patterns contracts by a ratio "the standard cycle Tk/the cycle T'" in the direction of the time period axis while the amplitude remains the same. In the fine-tuning-pattern correcting process carried out by the printer according to the present invention, if the ratio of the standard cycle Tk/the cycle T' is less than 1, the printer uses a known analyzing method to carry out the contraction process mentioned earlier, thereby correcting the driving speed fine tuning pattern corresponding to the standard linear speed Vk to the driving speed fine tuning patterns corresponding to a second linear speed. The correction mentioned earlier is carried out for the photosensitive drums 3Y, 3C, and 3M that are rotated at the respective individual linear speeds Vy, Vc, and Vm.

Figure 29:
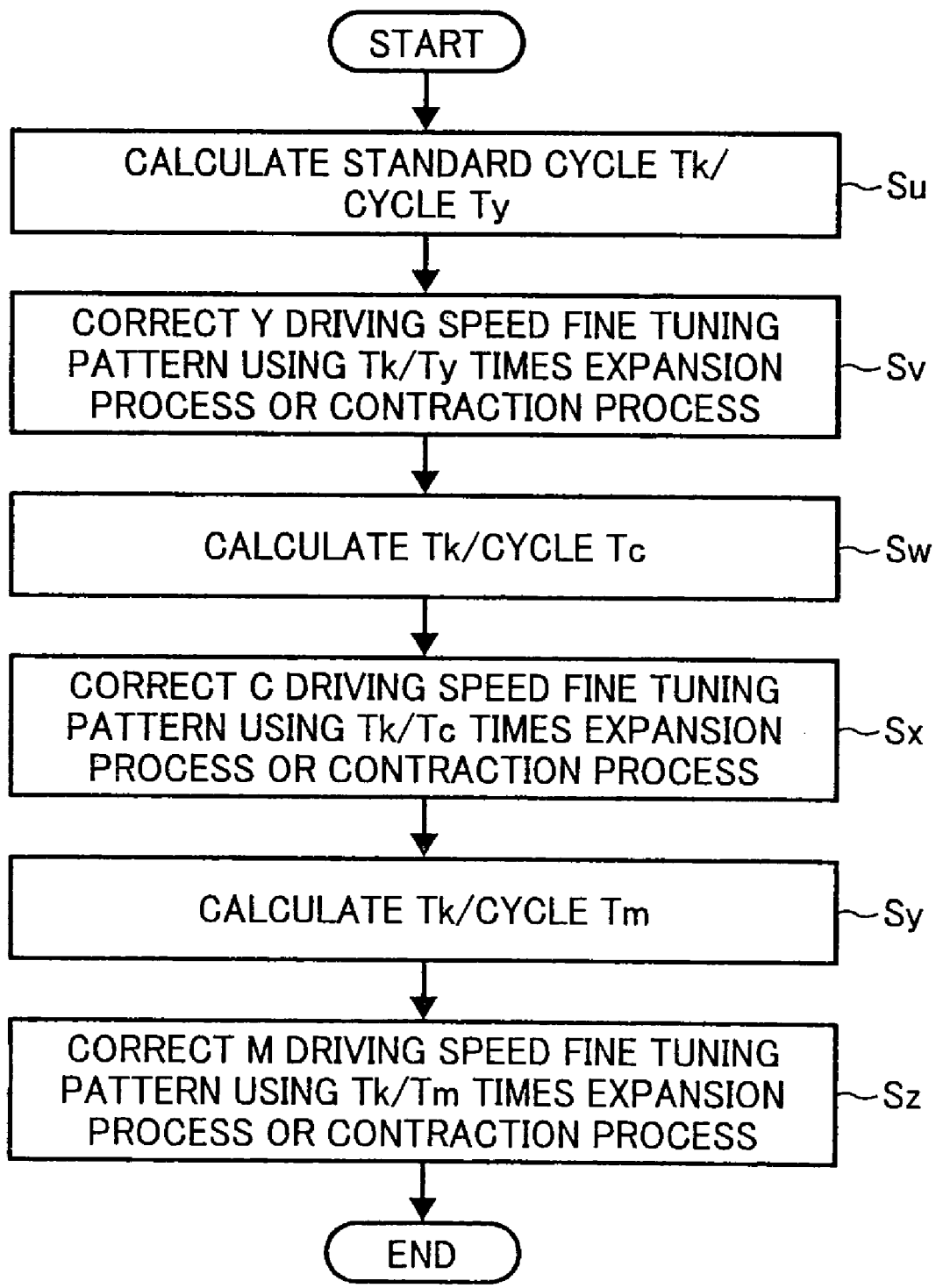
FIG. 29 is a flowchart of a fine-tuning-pattern correcting process that is executed by the controller.

FIG. 29 is a flowchart of the fine-tuning-pattern correcting process that is carried out by the controller of the printer according to the present invention. In the fine-tuning-pattern correcting process, which is carried out after a process flow that is shown in FIG. 25, the controller calculates a ratio "Tk/Ty" that indicates a ratio of the standard cycle Tk that is a single rotation cycle of the photosensitive drums 3Y, 3C, and 3M corresponding to the standard linear speed Vk, and a cycle Ty of the photosensitive drum 3Y corresponding to the Y individual linear speed Vy that is determined in the individual linear-speed determining process mentioned earlier (Su). Next, the controller carries out the expansion process or the contraction process to expand or contract the Y driving speed fine tuning pattern by "Tk/Ty" times in the direction of the time period axis, thus correcting the Y driving speed fine tuning pattern (Sv). The controller also carries out the correcting process mentioned earlier for the photosensitive drums 3C and 3M (Sw, Sx, Sy, and Sz).

Figure 30B:
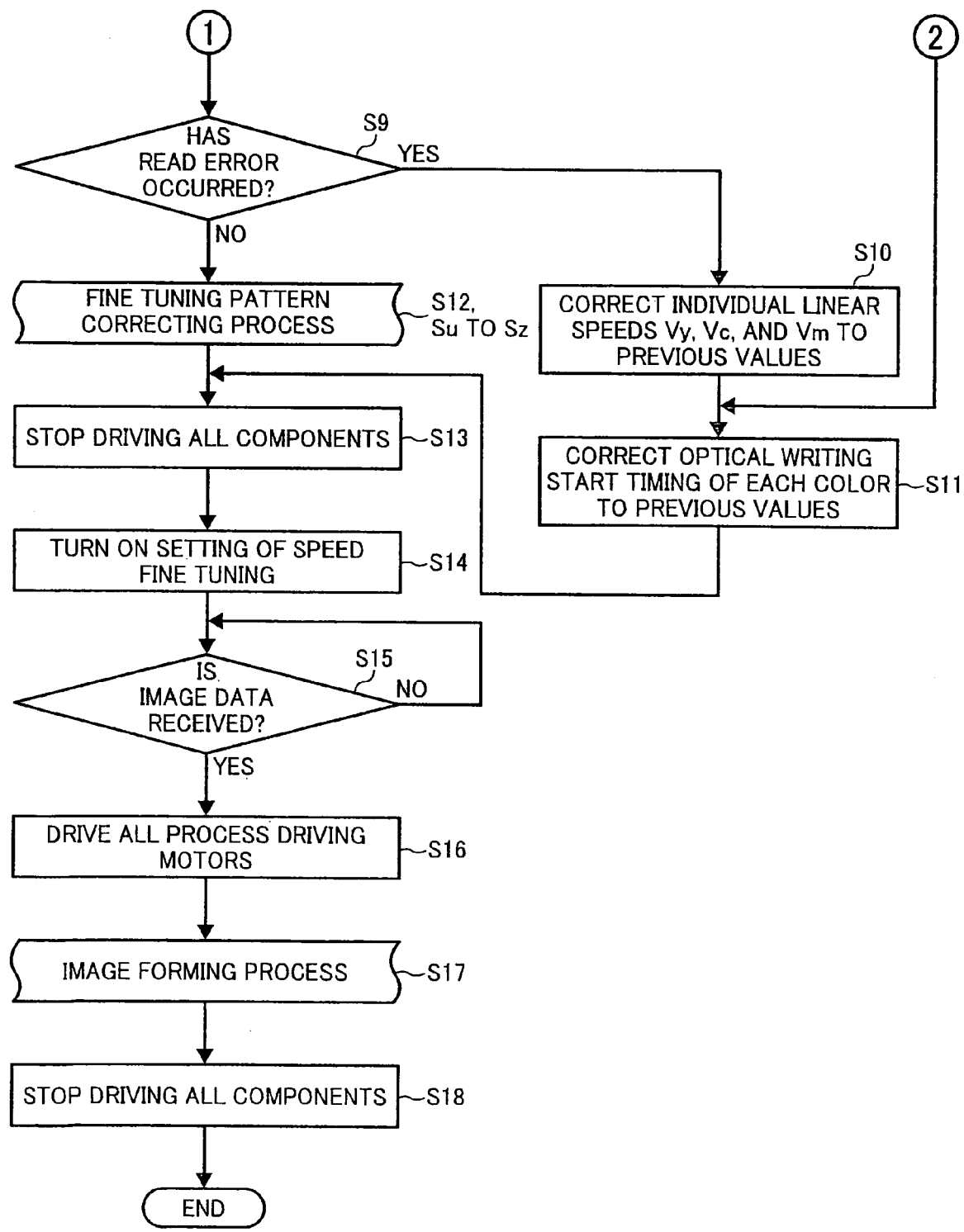
FIG. 30 is a flowchart of a routine after a processor removal detection that is carried out by the controller.

FIG. 30 is a flowchart of a process of a routine after a processor removal detection in the printer according to the present invention. Upon detecting a removal of any one of the processors 1Y, 1C, 1M, and 1K (S1), the controller turns off, for each process driving motor, a setting of speed fine tuning that is based on the driving speed fine tuning pattern (S2). Next, the controller causes each photosensitive drum to rotate at the standard linear speed Vk (S3) and executes the timing correcting process mentioned earlier (S4, the same as Sa to Si shown in FIG. 12). Next, during the timing correcting process, the controller reads the misalignment detecting images and determines whether a read error has occurred (S5). If a read error has occurred (Yes at S5), the controller again corrects the optical-writing start timing of each color to the value before timing correction (S11) and stops driving all the components (S13).

If a read error has not occurred during the timing correcting process (No at S5), the controller executes the individual linear-speed determining process (S6, the same as Sj to Sl shown in FIG. 13), the fluctuation pattern determining process (S7, the same as Sm to Sr shown in FIG. 25), and the fine-tuning-pattern determining process (S8, the same as Ss and St shown in FIG. 25) that are mentioned earlier. Next, the controller determines whether a read error has occurred during reading of the speed-fluctuation detecting images in the fluctuation-pattern detecting process (S9). If a read error has occurred (Yes at S9), the controller corrects to the previous values, the individual linear speeds Vy, Vc, and Vm that are determined in the individual linear-speed determining process (S10), corrects to the previous values, the optical-writing start timing of each color (S11), and stops driving all the components (S13).

If a read error has not occurred during the fluctuation-pattern detecting process (No at S9), the controller carries out the fine-tuning-pattern correcting process (S12, the same as Su to Sz shown in FIG. 29), stops driving all the components (S13), and turns on for each process driving motor, the setting of speed fine tuning that is based on the driving speed fine tuning pattern (S14).

Next, upon waiting for a receipt of the image data that is transmitted from an external source (Yes at S15), the controller starts driving the process driving motors 120Y, 120C, 120M, and 120K using the respective driving speed fine tuning patterns to ensure that the photosensitive drums 3Y, 3C, 3M, and 3K are stably rotated at the respective individual linear speeds Vy, Vc, Vm, and the standard linear speed Vk (S16). Next, after carrying out the image forming process based on the image data (S17), the controller stops driving all the components (S18) and ends a string of the control flow.

In the printer according to the present invention that includes the structure mentioned earlier, for curbing the superposing misalignment of less than or equal to half a dot in the image forming process, the controller causes the photosensitive drums 3Y, 3C, and 3M to rotate at the respective individual linear speeds Vy, Vc, and Vm that differ from the standard linear speed Vk. Further, even after carrying out the image forming process mentioned earlier, the controller causes the photosensitive drums 3Y, 3C, and 3M to rotate using the appropriate driving speed fine tuning patterns corresponding to the individual linear speeds Vy, Vc, and Vm without again detecting the respective speed fluctuation patterns by causing the photosensitive drums 3Y, 3C, and 3M to rotate at the respective individual linear speeds Vy, Vc, and Vm. Due to this, even if the linear speed differences Dy, Dc, and Dm are imparted to the respective photosensitive drums 3Y, 3C, and 3M with respect to the photosensitive drum 3K, a necessity to detect the speed fluctuation patterns using the new individual linear speeds Vy, Vc, and Vm is removed. Thus, a lengthening of the waiting time period of the user can be avoided whenever modifying the linear speed differences Dy, Dc, and Dm.

The printer according to the present invention includes an operation display unit that is formed of a not shown liquid crystal display (LCD) or a numeric keypad. Carrying out an operation on the operation display unit enables the user to switch a printing speed mode between a low speed printing mode and a high speed printing mode. Further, carrying out a setting of a printer driver such as the not shown personal computer also enables the user to switch the printing speed mode between the low speed printing mode and the high speed printing mode. In the low speed printing mode, the controller causes the photosensitive drum 3K to rotate at a first standard linear speed Vk1 and causes the photosensitive drums 3Y, 3C, and 3M to rotate at respective first individual linear speeds Vy1, Vc1, and Vm1 corresponding to the first standard linear speed Vk1. In the high speed printing mode, the controller causes the photosensitive drum 3K to rotate at a second standard linear speed Vk2 that is faster than the first standard linear speed Vk1. Further, the controller causes the photosensitive drums 3Y, 3C, and 3M to rotate at respective second individual linear speeds Vy2, Vc2, and Vm2 corresponding to the second standard linear speed Vk2. Although the standard linear speed is simply denoted as Vk for the sake of convenience, the standard linear speed Vk indicates both the first standard linear speed Vk1 and the second standard linear speed Vk2. Similarly, although the Y, C, and M individual linear speeds are simply denoted as Vy, Vc, and Vm respectively, the Y, C, and M individual linear speeds indicate both the respective first individual linear speeds Vy1, Vc1, Vm1, and the respective second individual linear speeds Vy2, Vc2, and Vm2. Further, although Y, C, and M individual cycles are simply denoted as Ty, Tc, and Tm respectively, the Y, C, and M individual cycles indicate respective first cycles Ty1, Tc1, Tm1 and respective second cycles Ty2, Tc2, and Tm2.

In the image forming process when the user has selected the low speed printing mode that is a first printing speed, the controller fine tunes the driving speed of the process driving motor 120K based on the K driving speed fine tuning pattern corresponding to the first standard linear speed Vk1 and fine tunes the driving speeds of the process driving motors 120Y, 120C, and 120M based on the respective Y, C, and M driving speed fine tuning patterns corresponding to the respective first individual linear speeds Vy1, Vc1, and Vm1.

In the image forming process when the user has selected the high speed printing mode that is a second printing speed, the controller fine tunes the driving speed of the process driving motor 120K based on the K driving speed fine tuning pattern corresponding to the second standard linear speed Vk2 and fine tunes the driving speeds of the process driving motors 120Y, 120C, and 120M based on the respective Y, C, and M driving speed fine tuning patterns corresponding to the respective second individual linear speeds Vy2, Vc2, and Vm2. The controller expands or contracts the K driving speed fine tuning pattern corresponding to the first standard linear speed Vk1 in the fine-tuning-pattern correcting process by carrying out the expansion process or the contraction process by "Vk1/Vk2" times in the direction of the time period axis, thus obtaining the K driving speed fine tuning pattern corresponding to the second standard linear speed Vk2. Further, the controller corrects the Y, C, and M driving speed fine tuning patterns corresponding to the first standard linear speed Vk1 by carrying out the expansion process or the contraction process by "Vk1/Vy2" times, "Vk1/Vc2" times, and "Vk1/Vm2" times respectively, thereby obtaining the respective Y, C, and M driving speed fine tuning patterns corresponding to the second individual linear speeds Vy2, Vc2, and Vm2 respectively. In the image forming process mentioned earlier, because the controller does not need to detect the Y, C, M, and K speed fluctuation patterns corresponding to the second standard linear speed Vk2 while causing each photosensitive drum to rotate at the second standard linear speed Vk2, a lengthening of the waiting time period of the user can be eliminated.

A second embodiment of the printer, which incorporates the present invention, is explained next. A structure of the printer according to the second embodiment is similar to the structure of the printer according to the first embodiment unless specified otherwise.

In the printer according to the first embodiment, the controller analyzes the respective driving speed fine tuning patterns corresponding to the standard linear speed Vk for the photosensitive drums 3Y, 3C, and 3M, and carries out the fine-tuning-pattern correcting process to correct the driving speed fine tuning patterns such that the driving speed fine tuning patterns correspond to the respective individual linear speeds Vy, Vc, and Vm.

However, in the printer according to the second embodiment, the controller does not execute the fine-tuning-pattern correcting process. Before the fine-tuning-pattern determining process, the controller carries out a fluctuation-pattern correcting process to correct the respective speed fluctuation patterns, of the photosensitive drums 3Y, 3C, and 3M, corresponding to the standard linear speed Vk such that the speed fluctuation patterns correspond to the respective individual linear speeds Vy, Vc, and Vm. The controller corrects the Y, C, and M speed fluctuation patterns corresponding to the standard linear speed Vk by carrying out the expansion process or the contraction process by "Vk/Vy" times, "Vk/Vc" times, and "Vk/Vm" times respectively. Thus, after the correction mentioned earlier, because the Y, C, and M speed fluctuation patterns correspond to the respective individual linear speeds Vy, Vc, and Vm, in a fine-tuning-pattern determining control, the controller can determine the respective Y, C, and M driving speed fine tuning patterns corresponding to the respective Y, C, and M speed fluctuation patterns.

In the structure of the printer according to the second embodiment, similarly as in the first embodiment, even if the linear speed differences Dy, Dc, and Dm, with respect to the photosensitive drum 3K, are imparted to the respective photosensitive drums 3Y, 3C, and 3M, a necessity to detect the speed fluctuation patterns using the new individual linear speeds Vy, Vc, and Vm is removed. Thus, a lengthening of the waiting time period of the user can be avoided whenever modifying the linear speed differences Dy, Dc, and Dm.

The printers according to the first and the second embodiments including further characteristic structures that are added to the respective printer according to the first embodiment or the printer according to the second embodiment are explained next. Structures of the printers according to the first and the second embodiments are similar to the respective structures of the printers according to the first embodiment or the second embodiment unless specified otherwise.

In the printer according to the first embodiment, immediately after a not shown power source is switched on, the controller carries out the timing correcting process, the individual linear-speed determining process, the fluctuation-pattern detecting process, the fine-tuning-pattern determining process, and the fine-tuning-pattern correcting process in the first embodiment. Similarly, immediately after the not shown power source is switched on, the controller carries out the timing correcting process, the individual linear-speed determining process, the fluctuation-pattern detecting process, the fluctuation-pattern correcting process, and the fine-tuning-pattern determining process in the second embodiment.

In the structure of the printer according to the first embodiment, due to the power source being switched off for a long time period, even if the optical-writing start timings of the respective colors are displaced from the respective appropriate optical-writing start timings before the power source is switched off, the image forming process is carried out after correcting the optical-writing start timings to the appropriate timings. Due to this, based on the initial image forming process after switching on the power source, the superposing misalignment of the toner image of each color in the secondary scanning direction can be appropriately curbed. Further, even if values of the appropriate individual linear speeds Vy, Vc, and Vm differ, due to correction of the optical-writing start timings, from the values before the correction, because the image forming process is executed after correcting the individual linear speeds Vy, Vc, and Vm to appropriate linear speeds, the superposing misalignment of less than or equal to half a dot in the secondary scanning direction of the toner image of each color can be suitably prevented. Further, even if the Y, C, and M driving speed fine tuning patterns become unsuitable due to correction of the individual linear speeds Vy, Vc, and Vm, because the image forming process is carried out after appropriately correcting the Y, C, and M driving speed fine tuning patterns, displacement of the dots due to speed fluctuations of the photosensitive drums 3Y, 3C, and 3M can be suitably curbed even by using the corrected individual linear speeds Vy, Vc, and Vm respectively.

In the printer according to the second embodiment, after each lapse of a predetermined time period when the power source is switched on, the controller carries out the timing correcting process, the individual linear-speed determining process, the fluctuation-pattern detecting process, the fine-tuning-pattern determining process, and the fine-tuning-pattern correcting process in the first embodiment. Similarly, after each lapse of the predetermined time period when the power source is switched on, the controller carries out the timing correcting process, the individual linear-speed determining process, the fluctuation-pattern detecting process, the fluctuation-pattern correcting process, and the fine-tuning-pattern determining process in the second embodiment. If the lapse of the predetermined time period occurs during a continuous printing operation, the continuous printing operation is temporarily stopped and the processes mentioned earlier are executed.

In the structure of the printer according to the second embodiment, even if the optical-writing start timings of the respective colors are displaced, due to a lapse of a long time period after carrying out the previous timing correcting process, from the respective appropriate optical-writing start timings, the image forming process is carried out after correcting the optical-writing start timings to the appropriate timings. Due to this, worsening of the superposing misalignment of the toner image of each color in the secondary scanning direction, as a result not carrying out the timing correcting process for a long time period when the power source is switched on, can be appropriately curbed. Further, even if the values of the appropriate individual linear speeds Vy, Vc, and Vm differ, due to correction of the optical-writing start timings, from the values before the correction, because the image forming process is executed after correcting the individual linear speeds Vy, Vc, and Vm to appropriate linear speeds, the superposing misalignment of less than or equal to half a dot in the secondary scanning direction of the toner image of each color can be suitably prevented. Further, even if the Y, C, and M driving speed fine tuning patterns become unsuitable due to correction of the individual linear speeds Vy, Vc, and Vm, because the image forming process is carried out after appropriately correcting the Y, C, and M driving speed fine tuning patterns, displacement of the dots due to speed fluctuations of the photosensitive drums 3Y, 3C, and 3M can be suitably curbed even by using the corrected individual linear speeds Vy, Vc, and Vm respectively.

In the printer according to a third embodiment of the present invention, after each printout of a predetermined number of pages, the controller carries out the timing correcting process, the individual linear-speed determining process, the fluctuation-pattern detecting process, the fine-tuning-pattern determining process, and the fine-tuning-pattern correcting process that are explained in the first embodiment. Similarly, after each printout of the predetermined number of pages, the controller carries out the timing correcting process, the individual linear-speed determining process, the fluctuation-pattern detecting process, the fluctuation-pattern correcting process, and the fine-tuning-pattern determining process that are explained in the second embodiment. If printing of the predetermined number of pages is carried out during a continuous printing operation, the continuous printing operation is temporarily stopped and the processes mentioned earlier are executed.

In the structure of the printer according to the third embodiment, similarly as in the second embodiment, even if the optical-writing start timings of the respective colors are displaced, due to a lapse of a long time period after carrying out the previous timing correcting process, from the respective appropriate optical-writing start timings, the image forming process is carried out after correcting the optical-writing start timings to the appropriate timings. Due to this, worsening of the superposing misalignment of the toner image of each color in the secondary scanning direction, as a result not carrying out the timing correcting process for a long time period when the power source is switched on, can be appropriately curbed. Further, even if the values of the appropriate individual linear speeds Vy, Vc, and Vm differ, due to correction of the optical-writing start timings, from the values before the correction, because the image forming process is executed after correcting the individual linear speeds Vy, Vc, and Vm to appropriate linear speeds, the superposing misalignment of less than or equal to half a dot in the secondary scanning direction of the toner image of each color can be suitably curbed. Further, even if the Y, C, and M driving speed fine tuning patterns become unsuitable due to correction of the individual linear speeds Vy, Vc, and Vm, because the image forming process is carried out after appropriately correcting the respective Y, C, and M driving speed fine tuning patterns, displacement of the dots due to speed fluctuations of the photosensitive drums 3Y, 3C, and 3M can be suitably curbed even by using the corrected individual linear speeds Vy, Vc, and Vm respectively.

Printing the predetermined number of pages is the same as carrying out an image forming operation for a predetermined number of times.

In the printer according to the present invention, during the fluctuation-pattern detecting process, the controller calculates for the Y, C, M, and K speed fluctuation patterns, which are detected based on a detection result of the respective speed-fluctuation detecting images, a maximum speed fluctuation amount in the respective speed fluctuation patterns.

Next, the controller determines whether the respective Y, C, M, and K maximum speed fluctuation amounts are less than or equal to a predetermined lower limit and greater than or equal to a predetermined upper limit. If the maximum speed fluctuation amount of a color (Y, C, M, and K) is less than or equal to the predetermined lower limit, the controller drives the process driving motor of the color at a constant speed in the image forming process without carrying out a driving speed fine tuning of the process driving motor based on the driving speed fine tuning pattern for that color. Similarly, if the maximum speed fluctuation amount of a color (Y, C, M, and K) is greater than or equal to the predetermined lower limit, the controller drives the process driving motor of the color at a constant speed in the image forming process without carrying out a driving speed fine tuning of the process driving motor based on the driving speed fine tuning pattern for that color. A reason to exercise such a control is explained next. In other words, a marginal error occurs between the gear predetermined angle timing, which indicates a timing when the markings 134Y, 134C, 134M, and 134K of the respective photosensitive drum gears 133Y, 133C, 133M, and 133K are detected by the respective position sensors 135Y, 135C, 135M, and 135K, and a timing when the photosensitive drum gears 133Y, 133C, 133M, and 133K are actually at the predetermined angle. The marginal error occurs due to limits of a detecting precision of the position sensors 135Y, 135C, 135M, and 135K and a rotation error of the process driving motors 120Y, 120C, 120M, and 120K. Due to the marginal error, even if the driving speeds of the process driving motors 120Y, 120C, 120M, and 120K are fine tuned based on the respective driving speed fine tuning patterns, a marginal fluctuation remains in the respective linear speeds of the photosensitive drums 3Y, 3C, 3M, and 3K. If the driving speeds are fine tuned based on the respective driving speed fine tuning patterns when the actual speed fluctuation of the photosensitive drums 3Y, 3C, 3M, and 3K is nearly absent, the marginal error mentioned earlier is likely to cause increased displacement of the dots compared to when the fine tuning is not carried out. To overcome the drawback, if the maximum speed fluctuation amount in the speed fluctuation pattern is less than or equal to the lower limit, the controller drives the process driving motor at a constant speed without fine tuning the driving speed. Due to this, a likelihood of increased speed fluctuation of the photosensitive drum can be avoided.

If the maximum speed fluctuation amount in the speed fluctuation pattern becomes greater than or equal to the upper limit at a time point regardless of being less than the upper limit after an initial operation, such a phenomenon indicates that due to some reason, an erroneous detection has occurred in the time period pitch errors of the toner images inside the speed-fluctuation detecting image. If the driving speed of the respective process driving motor is fine tuned using the driving speed fine tuning pattern that is based on data of the erroneous detection, the erroneous detection is likely to cause increased displacement of the dots compared to when the fine tuning is not carried out. To overcome the drawback, even if the maximum speed fluctuation amount in the speed fluctuation pattern is greater than or equal to the upper limit, the controller drives the respective process driving motor at a constant speed without fine tuning the driving speed. Due to this, a likelihood of increased speed fluctuation of the photosensitive drum can be avoided.

In the structure of the printer explained earlier, the Y, C, M, and K toner images of the respective photosensitive drums 3Y, 3C, 3M, and 3K are superposed and primary transferred onto the intermediate transfer belt 41, and the superposed toner images are secondary transferred to the recording sheet P. However, the present invention can also be applied to an image forming apparatus in which the Y, C, M, and K toner images of the respective photosensitive drums 3Y, 3C, 3M, and 3K are stored on a surface of a sheet transporting belt and the stored toner images are superposed and primary transferred to the recording sheet P that is transported.

Further, in an image forming apparatus that includes only one photosensitive drum, the present invention can also be applied as a means for obtaining a driving speed fine tuning pattern for the high speed printing mode based on the speed fluctuation pattern for the low speed printing mode.

The printer explained in the embodiments mentioned earlier includes the multiple image carriers in the form of the photosensitive drums 3Y, 3C, 3M, and 3K and the multiple driving sources in the form of the process driving motors 120Y, 120C, 120M, and 120K. The printer further includes visual image forming units, which are formed of the processors 1Y, 1C, 1M, and 1K and the optical writing unit 20, and that form visual images in the form of the Y, C, M, and K toner images on the respective photosensitive drums 3Y, 3M, 3C, and 3K. The printer also includes a transferring mechanism in the form of the transfer unit 40 that transfers onto a transfer member in the form of the intermediate transfer belt 41, the Y, C, M, and K toner images that are formed on the respective photosensitive drums 3Y, 3C, 3M, and 3K. Based on a detection result by the optical sensor 136, of the speed-fluctuation detecting images that are formed on the respective photosensitive drums 3Y, 3C, 3M, and 3K during the fluctuation-pattern detecting process, the controller detects the speed fluctuation patterns corresponding to the respective photosensitive drums 3Y, 3C, 3M, and 3K. In the fine-tuning-pattern determining process, based on a detection result of the speed fluctuation patterns, the controller determines the driving speed fine tuning patterns of the process driving motors 120Y, 120C, 120M, and 120K. Similarly, after correcting the speed fluctuation patterns corresponding to the respective photosensitive drums 3Y, 3C, 3M, and 3K in the fluctuation-pattern correcting process, the controller determines the driving speed fine tuning patterns corresponding to the respective speed fluctuation patterns in the fine-tuning-pattern determining process. In the image forming process, the controller drives the process driving motors 120Y, 120C, 120M, and 120K using the corresponding driving speed fine tuning patterns. Because a necessity to detect the speed fluctuation patterns using the linear speeds after modification is removed, a lengthening of the waiting time period of the user can be avoided whenever the linear speeds of the photosensitive drums 3Y, 3C, 3M, and 3K are modified.

The printer explained in the embodiments mentioned earlier includes a control unit in the form of the controller. Prior fixed toner images are formed on the photosensitive drums 3Y, 3C, 3M, and 3K and the toner images are transferred onto the surface of the intermediate transfer belt 41 to obtain the respective misalignment detecting images. Based on the detection timing of each toner image inside the respective misalignment detecting images by an image detecting unit in the form of the optical sensor 136, the controller corrects the optical-writing start timing (image formation start timing) of the respective photosensitive drums 3Y, 3C, 3M, and 3K. Next, the controller executes the timing correcting process for reducing the superposing misalignment in the secondary scanning direction of the toner images from the respective photosensitive drums 3Y, 3C, 3M, and 3K to the intermediate transfer belt 41. Minute expansion of the components due to environmental variation and due to an external force causes a fluctuation in the optical path of the laser beam used for optical writing, thus resulting in the superposing misalignment of the toner images in the secondary scanning direction. However, using the structure mentioned earlier enables to periodically eliminate worsening of the superposing misalignment.

In the printer explained in the embodiments mentioned earlier, based on the superposing misalignment amounts, of the toner images, that occur even in the optical-writing start timings that are corrected in the timing correcting process, the controller executes, except for the photosensitive drum 3K that is a standard, the linear-speed determining process to individually determine the individual linear speeds Vy, Vc, and Vm that are nonstandard linear speeds for the photosensitive drums 3Y, 3C, and 3M respectively. In the image forming process, the controller executes a process to form an image based on the image data while causing the standard photosensitive drum 3K to rotate at the standard linear speed Vk and causing the other photosensitive drums 3Y, 3C, and 3M to rotate at the respective individual linear speeds Vy, Vc, and Vm that are the individual nonstandard linear speeds. Using the structure mentioned earlier enables to reduce the superposing misalignment of less than or equal to half a dot that occurs even in the optical-writing start timings that are corrected using the timing correcting process.

In the printer according to the embodiments mentioned earlier, based on a predetermined command in the form of a key operation from the user or command signals from the printer, the controller executes a process to switch a printing speed (image forming speed) at the time of executing the image forming process between the low speed printing mode that is the first printing speed corresponding to the standard linear speed Vk and the high speed printing mode that is the second printing speed that differs from the first printing speed. Next, the controller executes as the timing correcting process, a process to individually correct for all the photosensitive drums 3Y, 3C, 3M, and 3K, the optical-writing start timings in the low speed printing mode and the optical-writing start timings in the high speed printing mode. Further, the controller executes as the individual linear-speed determining process, a process to determine the respective individual linear speeds Vy1, Vc1, and Vm1 in the low speed printing mode and the respective individual linear speeds Vy2, Vc2 and Vm2 in the high speed printing mode. Further, the controller executes as the fine-tuning-pattern correcting process, a process to correct the Y, C, M, and K driving speed fine tuning patterns in the low speed printing mode and the Y, C, M, and K driving speed fine tuning patterns in the high speed printing mode. Alternatively, the controller executes as the fluctuation-pattern correcting process, a process to obtain the Y, C, M, and K speed fluctuation patterns in the high speed printing mode by correcting the respective Y, C, M, and K speed fluctuation patterns in the low speed printing mode. Using the structure mentioned earlier removes the necessity of actually detecting the Y, C, M, and K speed fluctuation patterns in the high speed printing mode when the photosensitive drum 3K is rotating at the standard linear speed Vk2 and the photosensitive drums 3Y, 3C, and 3M are rotating at the respective individual linear speeds Vy2, Vc2, and Vm2 in the high speed printing mode. Thus, lengthening of the waiting time period of the user can be avoided.

Further, in the printer according to the embodiments mentioned earlier, before starting the image forming process, the controller executes the individual linear-speed determining process and the fine-tuning-pattern correcting process or the fluctuation-pattern correcting process. Due to this, a necessity to execute the processes mentioned earlier during the image forming process is removed. Thus, lengthening of a printing time period can be avoided.

In the printer according to the first embodiment, the controller exercises control, which is based on switching on of the power source, and carries out the timing correcting process, the individual linear-speed determining process, the fluctuation-pattern detecting process, the fine-tuning-pattern determining process, and the fine-tuning-pattern correcting process, or carries out the timing correcting process, the individual linear-speed determining process, the fluctuation-pattern detecting process, the fluctuation-pattern correcting process, and the fine-tuning-pattern determining process. In the structure of the printer according to the first embodiment, even if the optical-writing start timings of the respective colors are displaced, due to the power source being switched off for a long time period, from the respective appropriate optical-writing start timings before the power source is switched off, the image forming process is carried out after correcting the optical-writing start timings to the appropriate timings. Due to this, based on the initial image forming process after switching on the power source, the superposing misalignment of the toner image of each color in the secondary scanning direction can be appropriately curbed. Further, even if values of the appropriate individual linear speeds Vy, Vc, and Vm differ, due to correction of the optical-writing start timings, from the values before the correction, because the image forming process is executed after correcting the individual linear speeds Vy, Vc, and Vm to appropriate linear speeds, the superposing misalignment of less than or equal to half a dot in the secondary scanning direction of the toner image of each color can be suitably prevented. Further, even if the Y, C, and M driving speed fine tuning patterns become unsuitable due to correction of the individual linear speeds Vy, Vc, and Vm, because the image forming process is carried out after appropriately correcting the Y, C, and M driving speed fine tuning patterns, displacement of the dots due to speed fluctuations of the photosensitive drums 3Y, 3C, and 3M can be suitably curbed even by using the corrected individual linear speeds Vy, Vc, and Vm respectively.

In the printer according to the second embodiment, the controller exercises control after each lapse of the predetermined time period and carries out the timing correcting process, the individual linear-speed determining process, the fluctuation-pattern detecting process, the fine-tuning-pattern determining process, and the fine-tuning-pattern correcting process, or carries out the timing correcting process, the individual linear-speed determining process, the fluctuation-pattern detecting process, the fluctuation-pattern correcting process, and the fine-tuning-pattern determining process. Using the structure mentioned earlier enables to avoid worsening of the superposing misalignment of the toner image of each color in the secondary scanning direction due to a lapse of a long time period after carrying out the previous timing correcting process. Further, even if the values of the appropriate individual linear speeds Vy, Vc, and Vm differ, due to correction of the optical-writing start timings, from the values before the correction, because the image forming process is executed after correcting the individual linear speeds Vy, Vc, and Vm to appropriate linear speeds, the superposing misalignment of less than or equal to half a dot in the secondary scanning direction of the toner image of each color can be suitably prevented. Further, even if the Y, C, and M driving speed fine tuning patterns become unsuitable due to correction of the respective individual linear speeds Vy, Vc, and Vm, because the image forming process is carried out after appropriately correcting the Y, C, and M driving speed fine tuning patterns, displacement of the dots due to speed fluctuations of the photosensitive drums 3Y, 3C, and 3M can be suitably curbed even by using the corrected individual linear speeds Vy, Vc, and Vm respectively.

In the printer according to the third embodiment, after each printout of the predetermined number of pages (after each occurrence of the image forming operation for a predetermined number of times), the controller exercises control and carries out the timing correcting process, the individual linear-speed determining process, the fluctuation-pattern detecting process, the fine-tuning-pattern determining process, and the fine-tuning-pattern correcting process, or carries out the timing correcting process, the individual linear-speed determining process, the fluctuation-pattern detecting process, the fluctuation-pattern correcting process, and the fine-tuning-pattern determining process. Using the structure mentioned earlier enables to avoid worsening of the superposing misalignment of the toner image of each color in the secondary scanning direction due to not carrying out the timing correcting process for a long time period while the power source is switched on. Further, even if the values of the appropriate individual linear speeds Vy, Vc, and Vm differ, due to correction of the optical-writing start timings, from the values before the correction, because the image forming process is executed after correcting the individual linear speeds Vy, Vc, and Vm to appropriate linear speeds, the superposing misalignment of less than or equal to half a dot in the secondary scanning direction of the toner image of each color can be suitably prevented. Further, even if the Y, C, and M driving speed fine tuning patterns become unsuitable due to correction of the respective individual linear speeds Vy, Vc, and Vm, because the image forming process is carried out after appropriately correcting the Y, C, and M driving speed fine tuning patterns, displacement of the dots due to speed fluctuations of the photosensitive drums 3Y, 3C, and 3M can be suitably curbed even by using the corrected individual linear speeds Vy, Vc, and Vm respectively.

In the printer according to the embodiments mentioned earlier, the photosensitive drums 3Y, 3C, 3M, and 3K are detachably arranged as the respective processors 1Y, 1C, 1M, and 1K inside and outside the chassis via a not shown opening that is arranged in the chassis of the main body of the printer. Due to this, the photosensitive drums 3Y, 3C, 3M, and 3K can be attached to or removed from the printer separately and can be separately substituted according to a degree of degradation.

Further, in the printer according to the embodiments mentioned earlier, charging units in the form of the charging units 5Y, 5C, 5M, and 5K, which separately and uniformly charge the respective photosensitive drums 3Y, 3C, 3M, and 3K, and the photosensitive drums 3Y, 3C, 3M, and 3K corresponding to the respective charging units 5Y, 5C, 5M, and 5K are stored as single units in a common storage member and are integrally attached inside and outside the chassis as the detachable processors 1Y, 1C, 1M, and 1K. Thus, including the photosensitive drums 3Y, 3C, 3M, and 3K along with surrounding components as the integral processors 1Y, 1C, 1M, and 1K enables to enhance maintainability.

In the printer according to the fourth embodiment, if the maximum speed fluctuation amounts in the speed fluctuation patterns are less than or equal to the predetermined lower limit or fall below the lower limit, the controller exercises control and drives the process driving motors 120Y, 120C, 120M, and 120K at a constant speed instead of driving the process driving motors 120Y, 120C, 120M, and 120K based on the respective driving speed fine tuning patterns. If the driving speeds are fine tuned based on the respective driving speed fine tuning patterns when the actual speed fluctuation of the photosensitive drums 3Y, 3C, 3M, and 3K is nearly absent, the displacement of the dots is likely to increase. However, using the structure mentioned earlier enables to avoid such a drawback.

Further, in the printer according to the fourth embodiment, if the maximum speed fluctuation amounts in the speed fluctuation patterns are greater than or equal to the predetermined upper limit or exceed the upper limit, the controller exercises control and drives the process driving motors 120Y, 120C, 120M, and 120K at a constant speed instead of driving the process driving motors 120Y, 120C, 120M, and 120K based on the respective driving speed fine tuning patterns. Regardless of the erroneous detection that has occurred in the time period pitch errors of the toner images inside the respective speed-fluctuation detecting images, if the driving speed of the process driving motors 120Y, 120C, 120M, and 120K is fine tuned using the driving speed fine tuning patterns that are based on the erroneously detected time period pitch errors, the displacement of the dots is likely to increase. However, using the structure mentioned earlier enables to avoid such a drawback.

As described above, according to one aspect of the present invention, a driving speed fine tuning pattern, which is based on a speed fluctuation pattern that is detected using a setting of a standard linear speed, is corrected by a fine-tuning-pattern correcting process such that the driving speed fine tuning pattern is suitable for a nonstandard linear speed, or alternatively, the speed fluctuation pattern detected using the setting of the linear speed is corrected by a fluctuation-pattern correcting process such that the speed fluctuation pattern is suitable for the nonstandard linear speed, and the driving speed fine tuning pattern is determined. Due to this, the driving speed fine tuning pattern, which suitably corresponds to the nonstandard linear speed, can be obtained without a necessity to again detect the speed fluctuation pattern using the setting of the nonstandard linear speed. Thus, removing the necessity to detect the speed fluctuation pattern whenever modifying the linear speed setting of the image carrier enables to avoid lengthening of a waiting time period of a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an image carrier on which an image is formed;
   a driving source that drives the image carrier;
   an image forming unit that forms the image on the image carrier based on image data;
   a transfer unit that transfers the image formed on the image carrier onto a transfer member;
   an image detecting unit that detects the image transferred onto the transfer member; and
   a control unit that controls the driving source, the image forming unit, and the transfer unit, wherein
   the control unit executes
      a fluctuation-pattern detecting process of forming a speed-fluctuation detecting image formed of a plurality of predetermined visual images on the image carrier, while causing the image carrier to rotate at a standard linear speed, transferring the speed-fluctuation detecting image onto the transfer member, and detecting a speed fluctuation pattern per single rotation of the image carrier based on detection time period intervals detected by the image detecting unit, for each visual image in the speed-fluctuation detecting image,
      a fine-tuning-pattern determining process of determining a driving speed fine tuning pattern per single rotation of the image carrier of the driving source based on the speed fluctuation pattern, and
      an image forming process of forming the image based on the image data while driving the driving source based on the driving speed fine tuning pattern,
   a process of forming the image based on the image data while causing the image carrier to rotate at a nonstandard linear speed that differs from the standard linear speed is executed as the image forming process, and
   a fine-tuning-pattern correcting process of correcting the driving speed fine tuning pattern based on the nonstandard linear speed is executed before the image forming process.

2. The image forming apparatus according to claim 1, wherein
   a plurality of image carriers and a plurality of driving sources are provided,
   the image forming unit forms the image on each of the image carriers,
   the transfer unit transfers the image formed on each of the image carriers onto the transfer member,
   the control unit drives each of the driving sources using the driving speed fine tuning pattern corresponding to each of the driving sources in the image forming process by detecting the speed fluctuation pattern of the speed-fluctuation detecting image formed on each of the image carriers based on a detection result by the image detecting unit, and either determining the driving speed fine tuning pattern of each of the driving sources based on a detection result of the speed fluctuation patterns at the fine tuning pattern detecting process or determining the driving speed fine tuning pattern corresponding to each of the speed fluctuation patterns at the fine-tuning-pattern determining process after correcting the speed fluctuation patterns at the fluctuation-pattern correcting process.

3. The image forming apparatus according to claim 2, wherein the control unit forms a predetermined visual image on each of the image carriers and transfers the visual image onto the transfer member to get a misalignment detecting image, corrects an image formation start timing for each of the image carriers based on a detection timing of each visual image detected by the image detecting unit in the misalignment detecting image, and executes a timing correcting process for reducing a superposing misalignment of the visual images from the image carriers onto the transfer member.

4. The image forming apparatus according to claim 3, wherein the control unit executes
   an individual linear-speed determining process of individually determining the nonstandard linear speed for image carriers other than an image carrier that is a standard, based on an superposing misalignment amount of the visual image that occurs regardless of the image formation start timing that is corrected by the timing correcting process, and
   a process of causing the standard image carrier to rotate at the standard linear speed while causing the other image carriers to rotate at the respective individual nonstandard linear speed to form the image based on the image data, as the image forming process.

5. The image forming apparatus according to claim 4, wherein the control unit executes a process of switching, based on a predetermined command, an image forming speed at the time of executing the image forming process, between a first printing speed that corresponds to the standard linear speed and a second printing speed that differs from the first printing speed, a process of individually correcting for all the image carriers, the image formation start timing for the first printing speed and the image formation start timing for the second printing speed, as the timing correcting process, a process of determining the respective nonstandard linear speed for the first printing speed and the respective nonstandard linear speed for the second printing speed, as the individual linear-speed determining process, and either a process of correcting the respective driving speed fine tuning pattern for the first printing speed and the respective driving speed fine tuning pattern for the second printing speed, as the fine-tuning-pattern correcting process, or a process of obtaining the speed fluctuation pattern for the second printing speed using a correction of the speed fluctuation pattern for the first printing speed, as the fluctuation-pattern correcting process.

6. The image forming apparatus according to claim 4, wherein the control unit executes the individual linear-speed determining process and either the fine-tuning-pattern correcting process or the fluctuation-pattern correcting process, before starting the image forming process.

7. The image forming apparatus according to claim 3, wherein the control unit executes the timing correcting process, an individual linear-speed determining process, the fluctuation-pattern detecting process, the fine-tuning-pattern determining process, and the fine-tuning-pattern correcting process, or the timing correcting process, the individual linear-speed determining process, the fluctuation-pattern detecting process, the fluctuation-pattern correcting process, and the fine-tuning-pattern determining process, upon power on of the image forming apparatus.

8. The image forming apparatus according to claim 2, wherein the image carriers can be individually detached via an opening that is arranged in a chassis of a main body of the image forming apparatus from inside and outside of the chassis.

9. The image forming apparatus according to claim 8, wherein charging units that individually and uniformly charge the respective image carriers and the image carriers corresponding to the respective charging units are stored as single units in a common storage member and are integrally attached inside and outside the chassis as detachable processors.

10. The image forming apparatus according to claim 1, wherein the control unit drives the driving source at a constant speed instead of driving the driving source based on the driving speed fine tuning pattern, upon a maximum speed fluctuation amount in the speed fluctuation pattern being equal to or smaller than a predetermined lower limit.

11. An image forming apparatus comprising:
an image carrier on which an image is formed;
a driving source that drives the image carrier;
an image forming unit that forms the image on the image carrier based on image data;
a transfer unit that transfers the image formed on the image carrier onto a transfer member;
an image detecting unit that detects the image transferred onto the transfer member; and
a control unit that controls the driving source, the image forming unit, and the transfer unit, wherein
the control unit executes a fluctuation-pattern detecting process of forming a speed-fluctuation detecting image formed of a plurality of predetermined visual images on the image carrier, while causing the image carrier to rotate at a standard linear speed, transferring the speed-fluctuation detecting image onto the transfer member, and detecting a speed fluctuation pattern per single rotation of the image carrier based on detection time period intervals detected by the image detecting unit, for each visual image in the speed-fluctuation detecting image, a fine-tuning-pattern determining process of determining a driving speed fine tuning pattern per single rotation of the image carrier of the driving source based on the speed fluctuation pattern, and an image forming process of forming the image based on the image data while driving the driving source based on the driving speed fine tuning pattern, a process of forming the image based on the image data while causing the image carrier to rotate at a nonstandard linear speed that differs from the standard linear speed is executed as the image forming process, a fluctuation-pattern correcting process of correcting the speed fluctuation pattern based on the nonstandard linear speed is executed before the image forming process, and a process of determining the driving speed fine tuning pattern based on the speed fluctuation pattern that is corrected by the fluctuation-pattern correcting process is executed as the fine-tuning-pattern determining process.

12. The image forming apparatus according to claim 11, wherein
a plurality of image carriers and a plurality of driving sources are provided,
the image forming unit forms the image on each of the image carriers,
the transfer unit transfers the image formed on each of the image carriers onto the transfer member,
the control unit drives each of the driving sources using the driving speed fine tuning pattern corresponding to each of the driving sources in the image forming process by detecting the speed fluctuation pattern of the speed-fluctuation detecting image formed on each of the image carriers based on a detection result by the image detecting unit, and either determining the driving speed fine tuning pattern of each of the driving sources based on a detection result of the speed fluctuation patterns at the fine tuning pattern detecting process or determining the driving speed fine tuning pattern corresponding to each of the speed fluctuation patterns at the fine-tuning-pattern determining process after correcting the speed fluctuation patterns at the fluctuation-pattern correcting process.

13. The image forming apparatus according to claim 12, wherein the control unit forms a predetermined visual image on each of the image carriers and transfers the visual image onto the transfer member to get a misalignment detecting image, corrects an image formation start timing for each of the image carriers based on a detection timing of each visual image detected by the image detecting unit in the misalignment detecting image, and executes a timing correcting process for reducing a superposing misalignment of the visual images from the image carriers onto the transfer member.

14. The image forming apparatus according to claim 13, wherein the control unit executes
an individual linear-speed determining process of individually determining the nonstandard linear speed for image carriers other than an image carrier that is a standard, based on an superposing misalignment amount of the visual image that occurs regardless of the image formation start timing that is corrected by the timing correcting process, and a process of causing the standard image carrier to rotate at the standard linear speed while causing the other image carriers to rotate at the respective individual nonstandard linear speed to form the image based on the image data, as the image forming process.

15. The image forming apparatus according to claim 14, wherein the control unit executes a process of switching, based on a predetermined command, an image forming speed at the time of executing the image forming process, between a first printing speed that corresponds to the standard linear speed and a second printing speed that differs from the first printing speed, a process of individually correcting for all the image carriers, the image formation start timing for the first printing speed and the image formation start timing for the second printing speed, as the timing correcting process, a process of determining the respective nonstandard linear speed for the first printing speed and the respective nonstandard linear speed for the second printing speed, as the individual linear-speed determining process, and either a process of correcting the respective driving speed fine tuning pattern for the first printing speed and the respective driving speed fine tuning pattern for the second printing speed, as the fine-tuning-pattern correcting process, or a process of obtaining the speed fluctuation pattern for the second printing speed using a correction of the speed fluctuation pattern for the first printing speed, as the fluctuation-pattern correcting process.

16. The image forming apparatus according to claim 14, wherein the control unit executes the individual linear-speed determining process and either the fine-tuning-pattern correcting process or the fluctuation-pattern correcting process, before starting the image forming process.

17. The image forming apparatus according to claim 13, wherein the control unit executes the timing correcting process, an individual linear-speed determining process, the fluctuation-pattern detecting process, the fine-tuning-pattern determining process, and the fine-tuning-pattern correcting process, or the timing correcting process, the individual linear-speed determining process, the fluctuation-pattern detecting process, the fluctuation-pattern correcting process, and the fine-tuning-pattern determining process, upon power on of the image forming apparatus.

18. The image forming apparatus according to claim 12, wherein the image carriers can be individually detached via an opening that is arranged in a chassis of a main body of the image forming apparatus from inside and outside of the chassis.

19. The image forming apparatus according to claim 18, wherein charging units that individually and uniformly charge the respective image carriers and the image carriers corresponding to the respective charging units are stored as single units in a common storage member and are integrally attached inside and outside the chassis as detachable processors.

20. The image forming apparatus according to claim 11, wherein the control unit drives the driving source at a constant speed instead of driving the driving source based on the driving speed fine tuning pattern, upon a maximum speed fluctuation amount in the speed fluctuation pattern being equal to or smaller than a predetermined lower limit.

* * * * *